United States Patent
Raccah et al.

(10) Patent No.: US 12,010,476 B2
(45) Date of Patent: Jun. 11, 2024

(54) COMMUNICATION SYSTEM AND METHOD

(71) Applicant: Midland Radio Corporation, Kansas City, MO (US)

(72) Inventors: Guy Raccah, Kowloon (HK); William H Darden, IV, Cary, NC (US)

(73) Assignee: Midland Radio Co tion, Kansas City, MO (US)

( * ) Notice: Subject to any disclaimer, the term of this patent is extended or adjusted under 35 U.S.C. 154(b) by 0 days.

(21) Appl. No.: 18/145,515

(22) Filed: Dec. 22, 2022

(65) Prior Publication Data

US 2023/0119365 A1  Apr. 20, 2023

Related U.S. Application Data

(63) Continuation of application No. 17/452,330, filed on Oct. 26, 2021, now Pat. No. 11,540,040.

(Continued)

(51) Int. Cl.
| | |
|---|---|
| H04R 1/10 | (2006.01) |
| H04R 5/033 | (2006.01) |
| H04W 4/80 | (2018.01) |

(52) U.S. Cl.
CPC .......... *H04R 1/1016* (2013.01); *H04R 1/105* (2013.01); *H04R 5/0335* (2013.01); *H04W 4/80* (2018.02); *H04R 2420/07* (2013.01)

(58) Field of Classification Search
CPC .... H04R 1/1016; H04R 1/105; H04R 5/0335; H04R 2420/07; H04R 1/1041;

(Continued)

(56) References Cited

U.S. PATENT DOCUMENTS 8,648,761 B2 * 2/2014 Ishibana ................ H01Q 19/26
381/381
8,879,722 B1  11/2014 Wang et al.
(Continued)

FOREIGN PATENT DOCUMENTS

| CA | 2939869 C | 3/2019 |
| CN | 201160277 | 12/2008 |

(Continued)

OTHER PUBLICATIONS

GearVita, Xiaomi Mijia Beebest BE501 Bluetooth Walkie Talkie Headset, 10 pages—Applicant Admitted Prior Art.
(Continued)

*Primary Examiner* — Angelica M McKinney
(74) *Attorney, Agent, or Firm* — AVEK IP, LLC

(57) ABSTRACT

A short-range communication system. The short-range communication system includes a plurality of wearable units, each of which include a hub having a speaker therein. Each wearable unit has a primary clip extending from the hub for selective attachment to a wearer's ear such that the speaker is directed to an ear canal of the wearer. Each wearable includes has a secondary clip extending outwardly from the hub such that an exterior side of the hub is between the secondary clip and the speaker, an antenna in the secondary clip, a reflector between the secondary clip and the speaker, and a microphone. Each wearable unit is in either a transmit state or a listener state, with a maximum of one said wearable unit being in the transmit state at any point in time. A stationary repeater having a processor and circuitry manipulates original RF signals transmitted by a transmitting wearable unit.

18 Claims, 28 Drawing Sheets

Related U.S. Application Data

(60) Provisional application No. 63/105,735, filed on Oct. 26, 2020.

(58) Field of Classification Search
CPC ............ H04R 2201/107; H04R 1/1091; H04R 1/1066; H04R 2201/10; H04R 25/55; H04R 25/65; H04R 2225/0213; H04R 2225/51; H04R 1/083; H04R 1/342; H04W 4/80; H01Q 1/273; H01Q 1/44; H01Q 19/26
See application file for complete search history.

(56) References Cited

U.S. PATENT DOCUMENTS

| | | | |
|---|---|---|---|
| 9,998,850 | B2 | 6/2018 | Broadley et al. |
| 11,540,040 | B2 * | 12/2022 | Raccah ................. H04R 1/1016 |
| 2008/0220831 | A1 | 9/2008 | Alameh et al. |
| 2008/0273735 | A1 * | 11/2008 | Burson .................. H04R 1/083 |
| | | | 381/363 |
| 2010/0310107 | A1 * | 12/2010 | Saila ........................ H04M 1/05 |
| | | | 381/363 |
| 2020/0120410 | A1 | 4/2020 | Akaike et al. |

FOREIGN PATENT DOCUMENTS

| | | | |
|---|---|---|---|
| CN | 210724784 | U | 6/2020 |
| JP | 2006086746 | A * | 3/2006 |
| KR | 20080014417 | A | 2/2008 |
| KR | 20110064684 | A | 6/2011 |
| KR | 101745866 | B1 | 6/2017 |
| WO | 2022094545 | A1 | 5/2022 |

OTHER PUBLICATIONS

International Search Report and Written Opinion, dated Feb. 11, 2022, 11 pages, issued in International Application No. PCT/US21/72025.

Quail digital, Pro11 Headset System Installation Manual, Aug. 9, 2021, 8 pages, London, United Kingdom.

Quail digital, Pro7 Headset System User Guide, Jul. 11, 2016, 16 pages, London, United Kingdom.

* cited by examiner

COMMUNICATION SYSTEM AND METHOD

RELATED APPLICATIONS

This application claims priority to and is a continuation of U.S. application Ser. No. 17/452,330, filed Oct. 26, 2021. This application further claims priority to U.S. Application No. 63/105,735, filed Oct. 26, 2020. Each is incorporated by reference in its entirety herein.

FIELD OF THE DISCLOSURE

The disclosure relates generally to the field of communications systems. More specifically, the disclosure relates to a communication system with a two-way radio system that is ear mounted and a repeater.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to an embodiment, a short-range communication system includes a plurality of units. Each of the units has a hub, a speaker, a primary clip, a secondary clip, an antenna, and a microphone. The hub has an exterior side and an interior side defining a hub cavity therebetween. The interior side has a speaker opening. The speaker is in the hub cavity and has an output directed to the speaker opening. The primary clip extends from the hub for selective attachment to a wearer's ear such that the speaker opening is directed to an ear canal of the wearer. The primary clip has a distal segment and a proximal segment, and the primary clip proximal segment connects the primary clip distal segment to the hub. The primary clip proximal segment is resiliently flexible such that a distance between the hub and the primary clip distal segment is variable. The secondary clip extends outwardly from the hub exterior side such that the hub exterior side is between the secondary clip and the hub interior side. The antenna is in the secondary clip.

According to another embodiment, a two-way radio system includes a plurality of units. Each of the units has a hub, a speaker, a primary clip, a secondary clip, an antenna, and a microphone. The hub has an exterior side and an interior side defining a hub cavity therebetween. The interior side has a speaker opening. The speaker is in the hub cavity and has an output directed to the speaker opening. The primary clip extends from the hub for selective attachment to a wearer's ear such that the speaker opening is directed to an ear canal of the wearer. The secondary clip extends outwardly from the hub exterior side such that the hub exterior side is between the secondary clip and the hub interior side. The secondary clip has an antenna support and an antenna cap; the antenna support is on an interior side of the secondary clip, and the antenna cap is on an exterior side of the secondary clip. The antenna support and the antenna cap define an antenna cavity, and the antenna is in the antenna cavity.

According to another embodiment of the present disclosure, a communication system includes a first wearable device, having an antenna, a power supply, and a microphone, the first wearable device is configured to operate between a talker (or "transmit") state and a listener state. The first wearable device is further configured to receive audio data when the first wearable device is in the talker state, convert the audio data to an RF signal, and transmit the RF signal away from the first wearable device. A repeater being separate from the first wearable device and in digital communication with the first wearable device, the repeater having a processor, and a repeater antenna, the repeater is configured to manipulate one or more qualities of the RF signal and route the RF signal to one or more listening wearable devices. The one or more listening wearable device each convert the RF signal to a second audio data.

According to another embodiment of the present disclosure, a method of communication includes providing a first wearable device having an antenna, a power supply, and a microphone, the first wearable device operates between a talker state and a listener state. Receiving audio data from a user when the first wearable device is in the talker state and converting the audio data to an RF signal via the first wearable device. Transmitting the RF signal to a repeater, the repeater being separate from the first wearable device and having a processor and a repeater antenna. Manipulating one or more qualities of the RF signal via a processor of the repeater and routing the RF signal to one or more listening wearable device, the one or more listening wearable device each convert the RF signal to a second audio data.

According to another embodiment, a short-range communication system comprises a plurality of wearable units. Each wearable unit has a hub having a speaker therein. Each wearable unit has a primary clip extending from the hub for selective attachment to a wearer's ear such that the speaker is directed to an ear canal of the wearer. Each wearable unit includes a secondary clip extending outwardly from the hub such that an exterior side of the hub is between the secondary clip and the speaker, an antenna in the secondary clip, a reflector between the secondary clip and the speaker, and a microphone. Each wearable unit is in either a transmit state or a listener state, with a maximum of one said wearable unit being in the transmit state at any point in time. The system includes a stationary repeater having a processor and circuitry configured to: (a) manipulate original RF signals transmitted by a transmitting wearable unit; and (b) transmit the manipulated RF signals to at least one listening wearable unit.

According to another embodiment, a short-range communication system comprises a plurality of wearable units. Each wearable unit has a hub having a speaker therein. Each wearable unit has a primary clip extending from the hub for selective attachment to a wearer's ear such that the speaker is directed to an ear canal of the wearer. Each wearable unit includes a secondary clip extending outwardly from the hub such that an exterior side of the hub is between the secondary clip and the speaker, an antenna in the secondary clip, a reflector between the secondary clip and the speaker, and a microphone. Each wearable unit is in either a transmit state or a listener state, with a maximum of one said wearable unit being in the transmit state at any point in time. The system includes a stationary repeater having a processor and circuitry configured to: (a) manipulate original RF signals transmitted by a transmitting wearable unit; and (b) transmit the manipulated RF signals to at least one listening wearable unit. Manipulating the original RF signals includes introducing a time offset to the original RF signals.

According to yet another embodiment, a short-range communication system comprises a plurality of wearable units. Each wearable unit has a hub having a speaker therein. Each wearable unit has a primary clip extending from the hub for selective attachment to a wearer's ear such that the speaker is directed to an ear canal of the wearer. Each wearable unit includes a secondary clip extending outwardly from the hub such that an exterior side of the hub is between the secondary clip and the speaker, an antenna in the secondary clip, a reflector between the secondary clip and the speaker, and a microphone. Each wearable unit is in either a transmit state or a listener state, with a maximum of one said wearable unit being in the transmit state at any point in time. The system includes a stationary repeater having a processor and circuitry configured to manipulate original RF signals transmitted by a transmitting wearable unit. A distance between the hub and the primary clip of at least one of the plurality of wearable units is configured to be variable.

BRIEF DESCRIPTION OF THE SEVERAL VIEWS OF THE DRAWINGS

Illustrative embodiments of the disclosure are described in detail below with reference to the attached figures.

DETAILED DESCRIPTION

Figure 1:
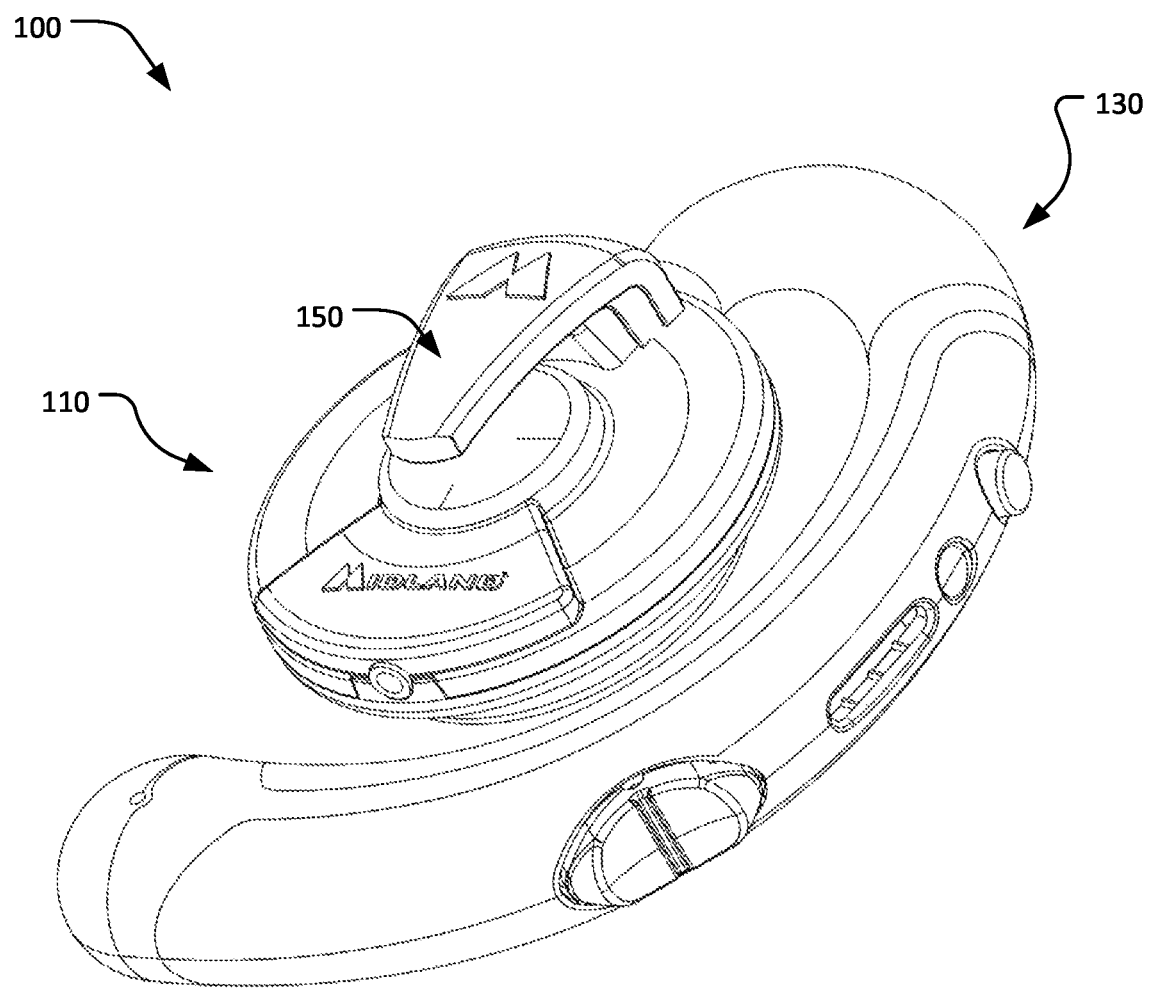
FIG. 1 is a front perspective view of a two-way radio unit, according to an embodiment of the current disclosure.
Figure 2:
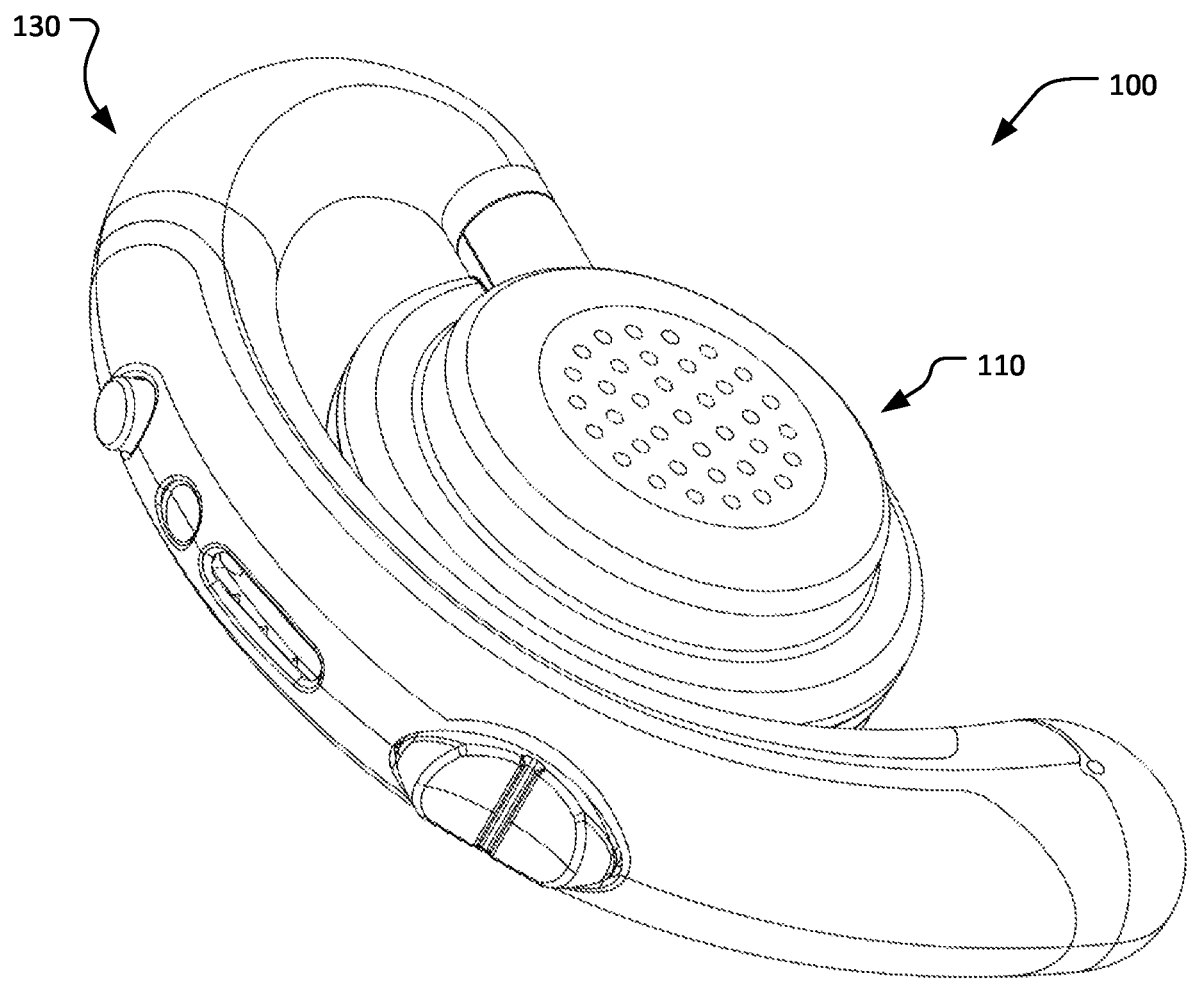
FIG. 2 is a rear perspective view of the two-way radio unit of FIG. 1.

FIGS. 1-18 disclose short-range communication systems having two-way radio units that are ear mounted. A two-way radio according to an embodiment 100 includes a hub 110, a primary clip 130, a secondary clip 150, and various electronic components (e.g., a first circuit board 201; a speaker 203; a microphone 205; a push to talk button 207; a second circuit board 209; user inputs 211 such as switches, buttons, knobs, et cetera; a battery 213; and/or an antenna 215).

Figure 5:
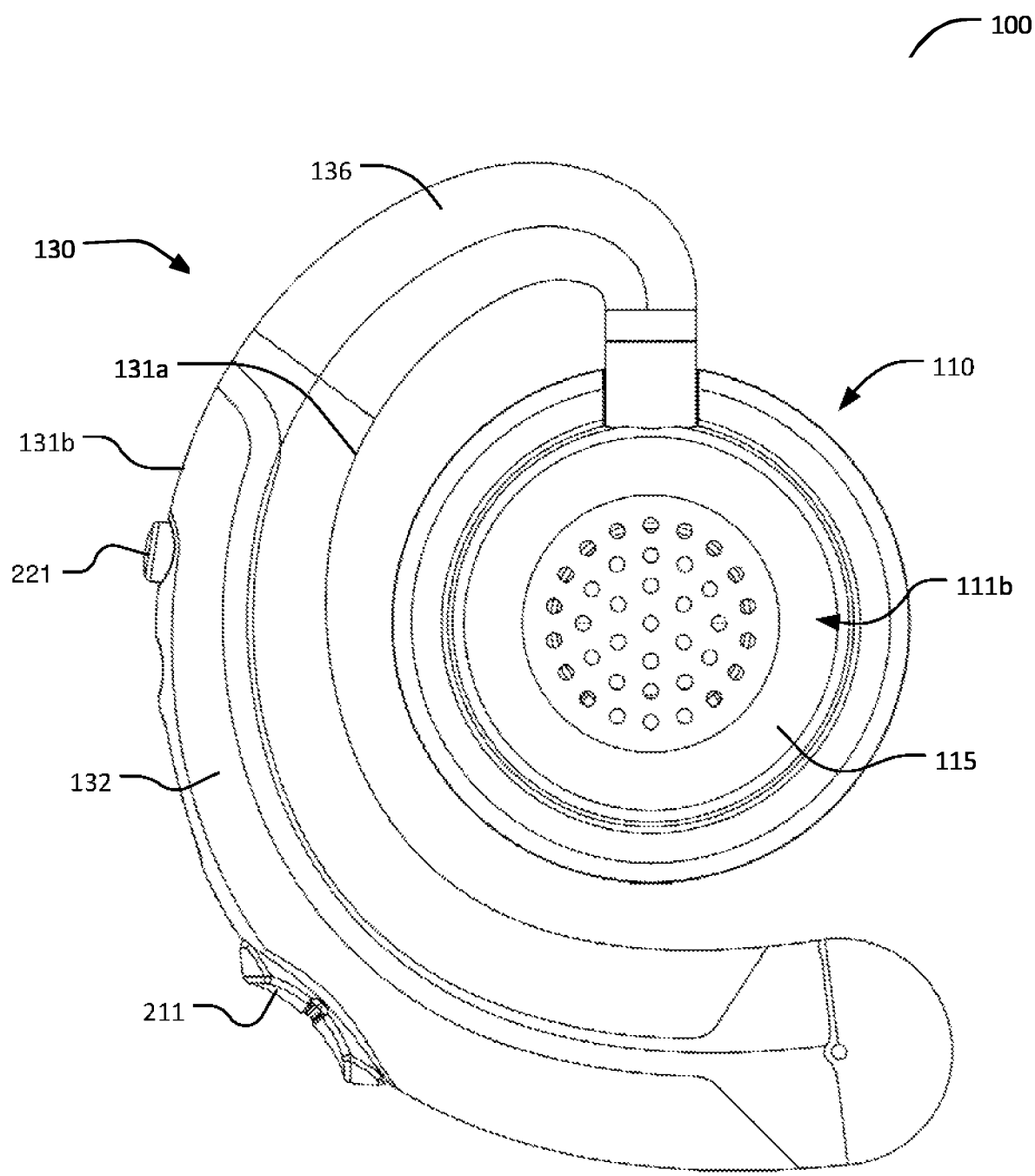
FIG. 5 is a rear view of the two-way radio unit of FIG. 1.
Figure 11A:
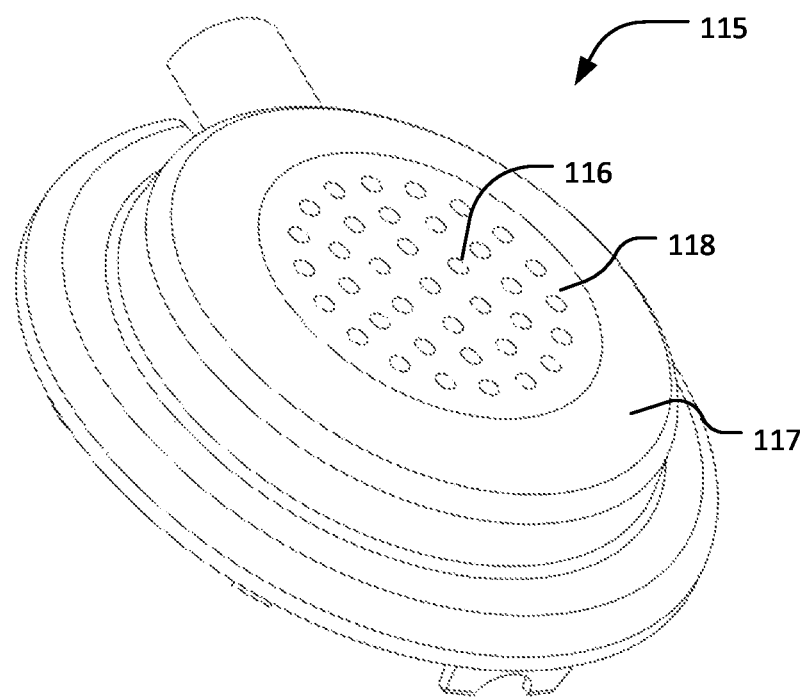
FIG. 11A is a perspective view of the interior housing of the two-way radio unit of FIG. 1.
Figure 11B:
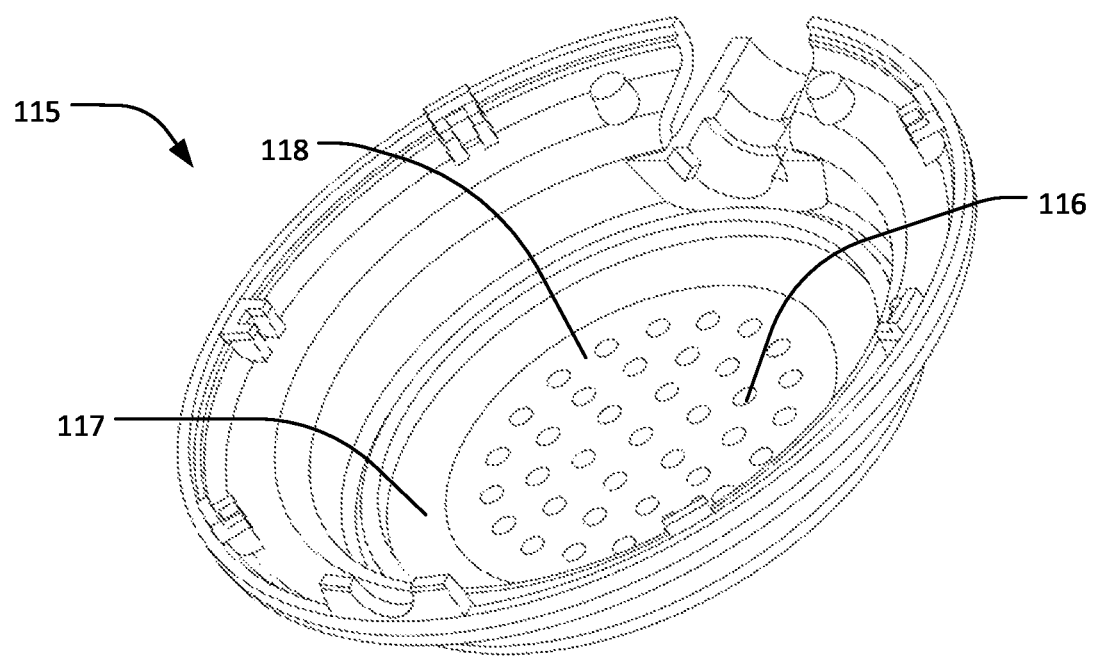
FIG. 11B is an opposite perspective view of the interior housing of the two-way radio unit of FIG. 1.
Figure 12A:
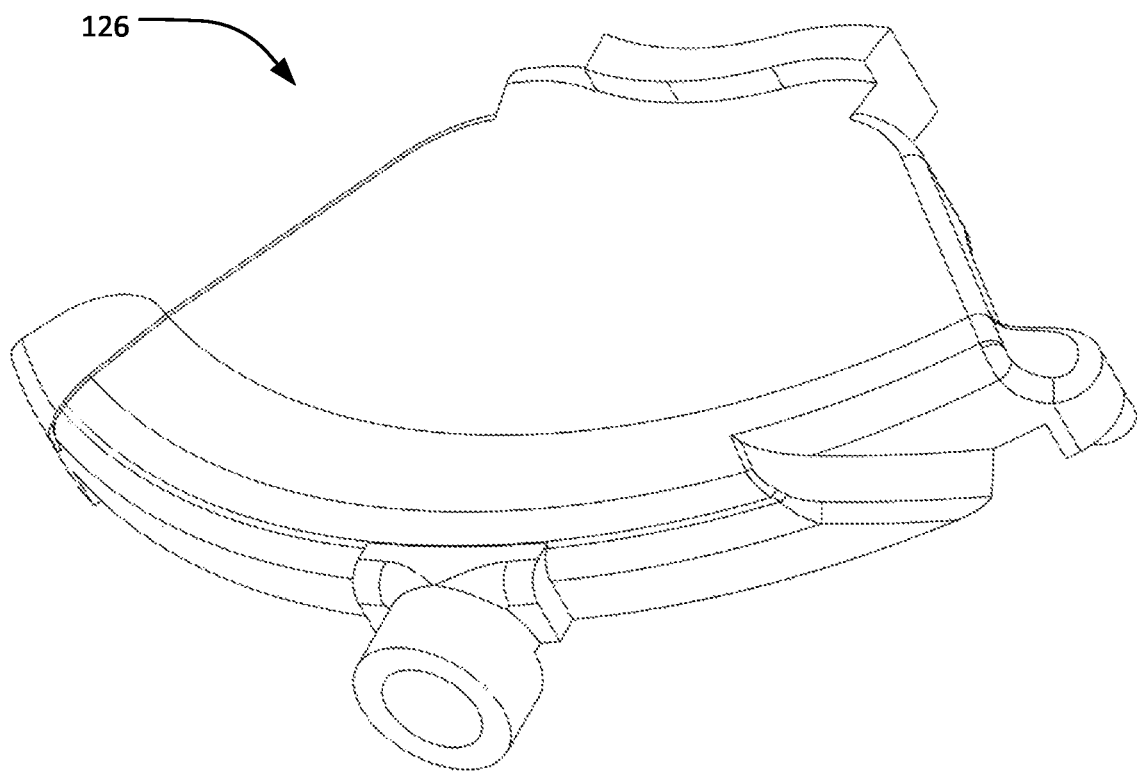
FIG. 12A is a perspective view of the support bridge of the two-way radio unit of FIG. 1.
Figure 12B:
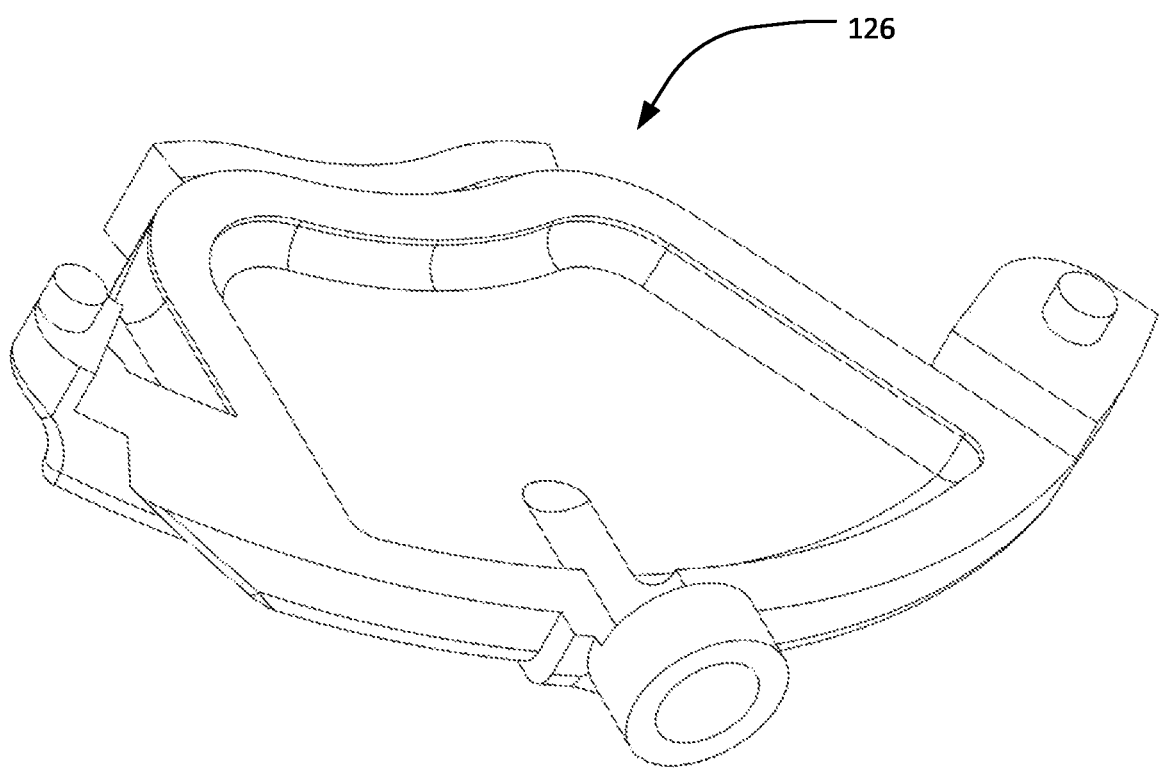
FIG. 12B is an opposite perspective view of the support bridge of the two-way radio unit of FIG. 1.
Figure 13A:
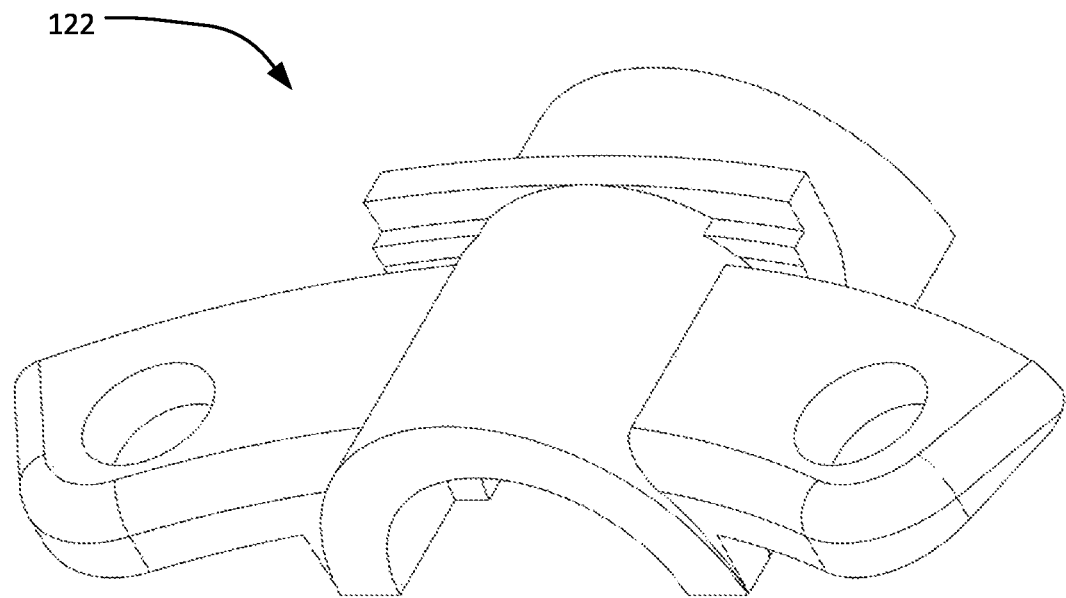
FIG. 13A is a perspective view of the neck lock of the two-way radio unit of FIG. 1.
Figure 13B:
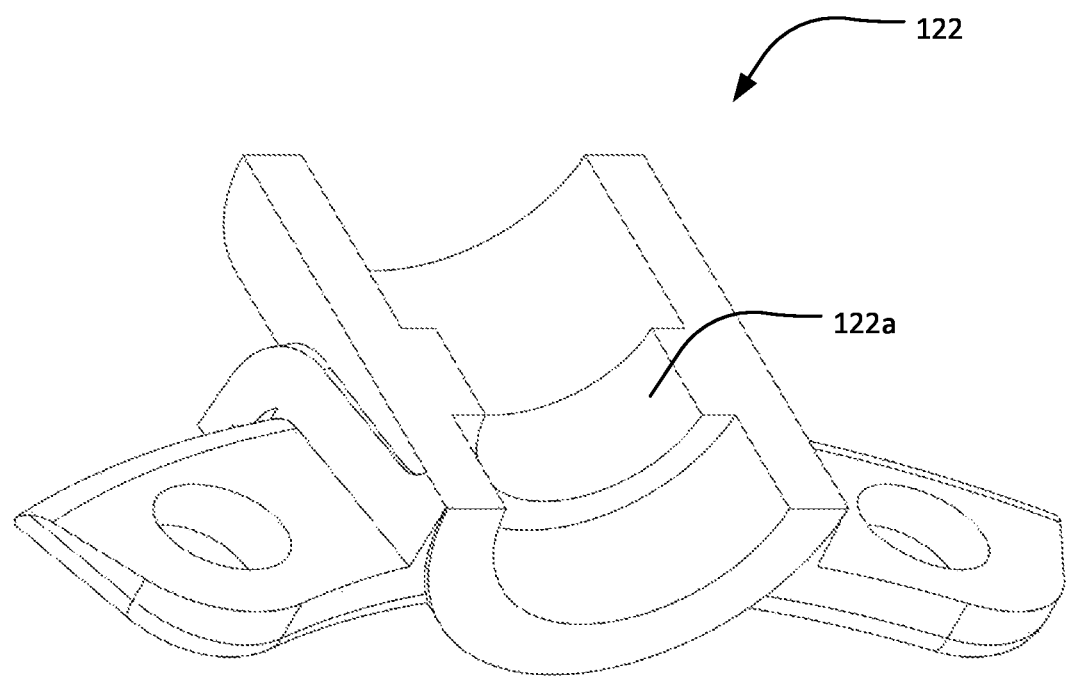
FIG. 13B is an opposite perspective view of the neck lock of the two-way radio unit of FIG. 1.
Figure 14A:
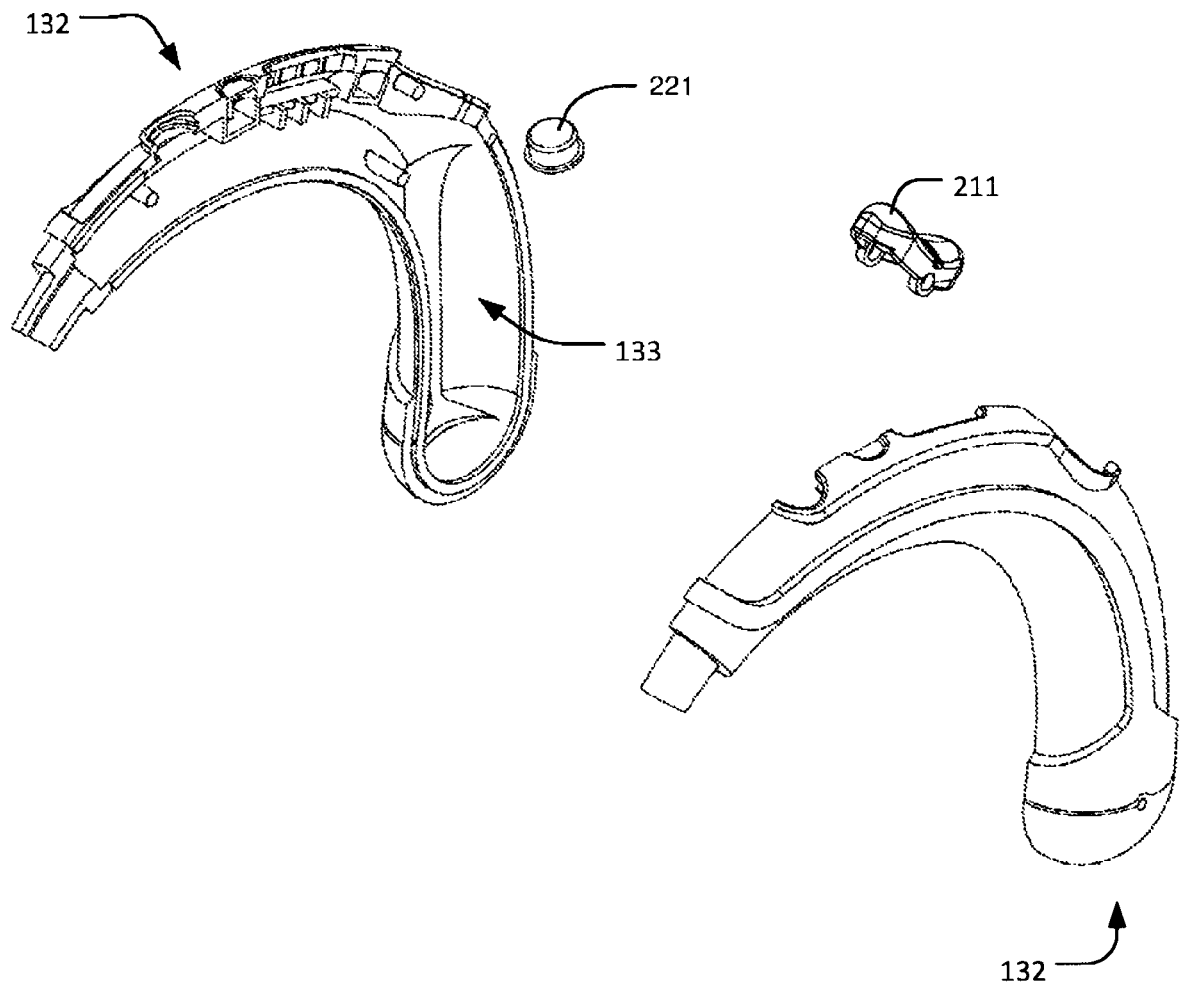
FIG. 14A is an exploded perspective view of the distal segment of the primary clip of the two-way radio unit of FIG. 1
Figure 14B:
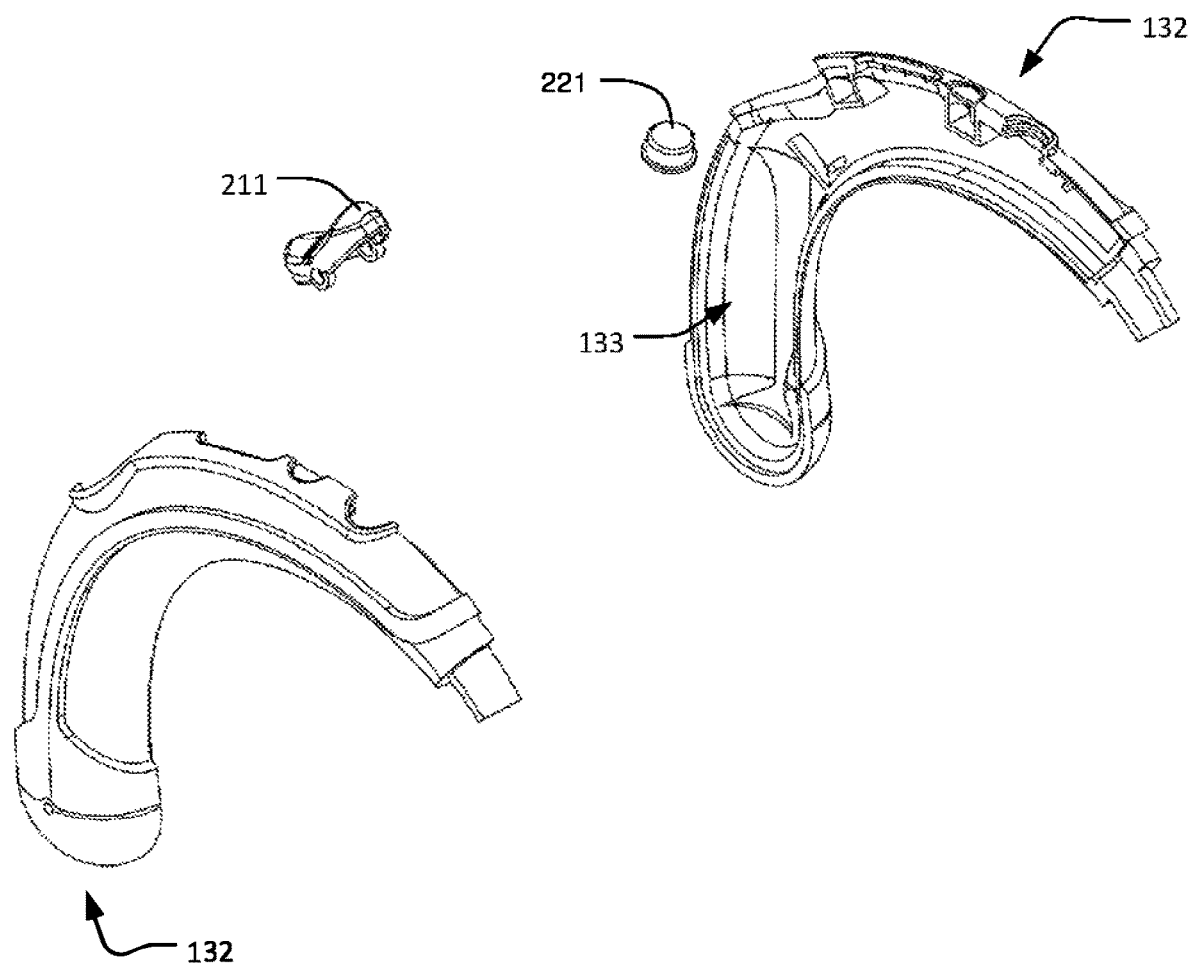
FIG. 14B is an opposite exploded perspective view of the distal segment of the primary clip of the two-way radio unit of FIG. 1
Figure 15:
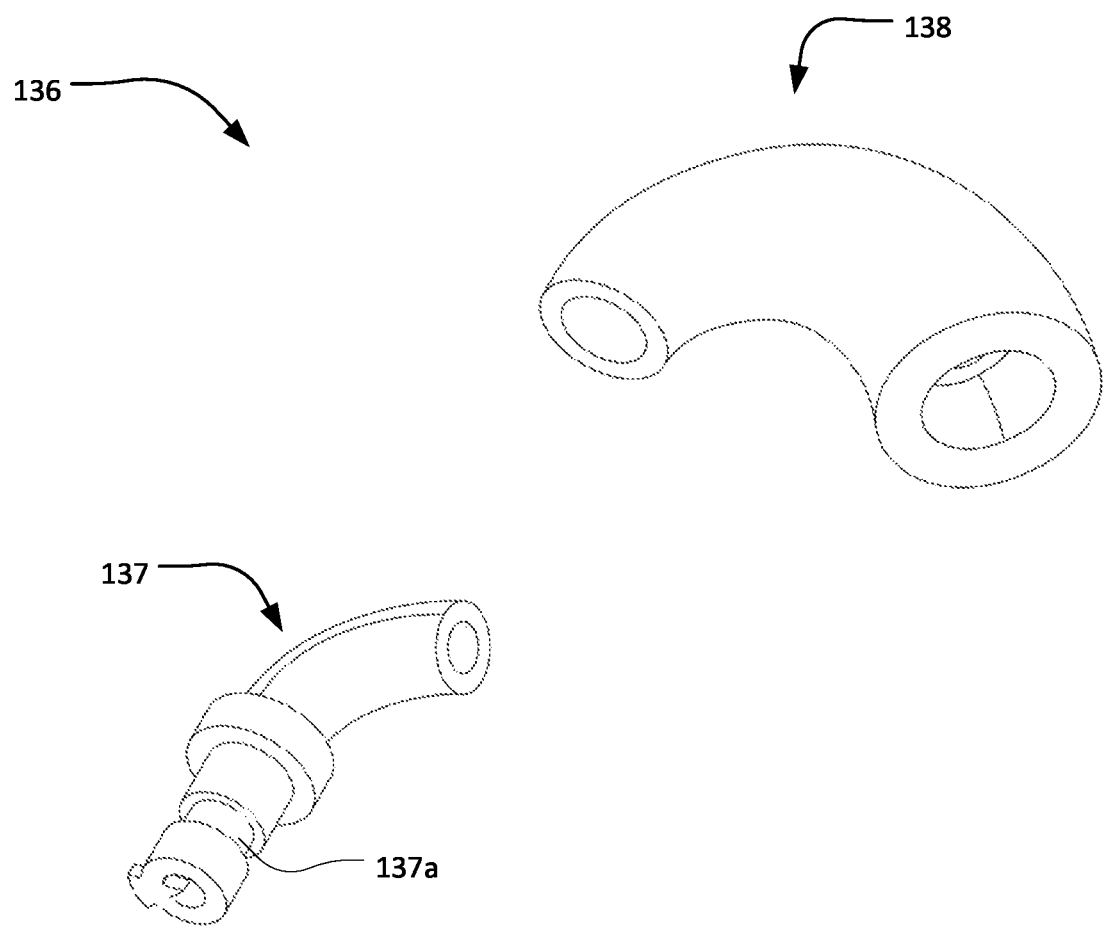
FIG. 15 is an exploded view of the proximal segment of the primary clip of the two-way radio unit of FIG. 1.
Figure 16A:
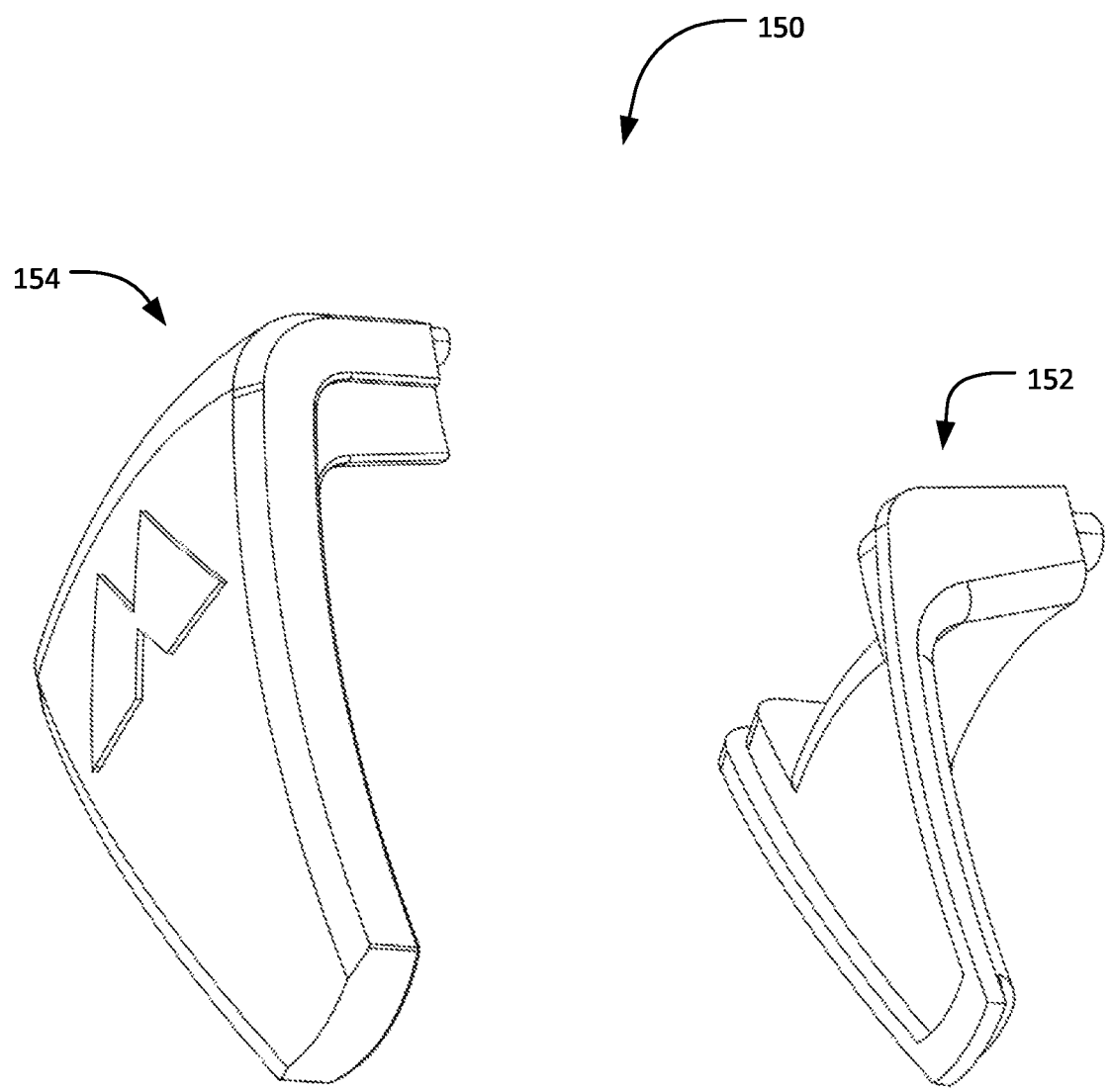
FIG. 16A is an exploded perspective view of the secondary clip of the two-way radio unit of FIG. 1
Figure 16B:
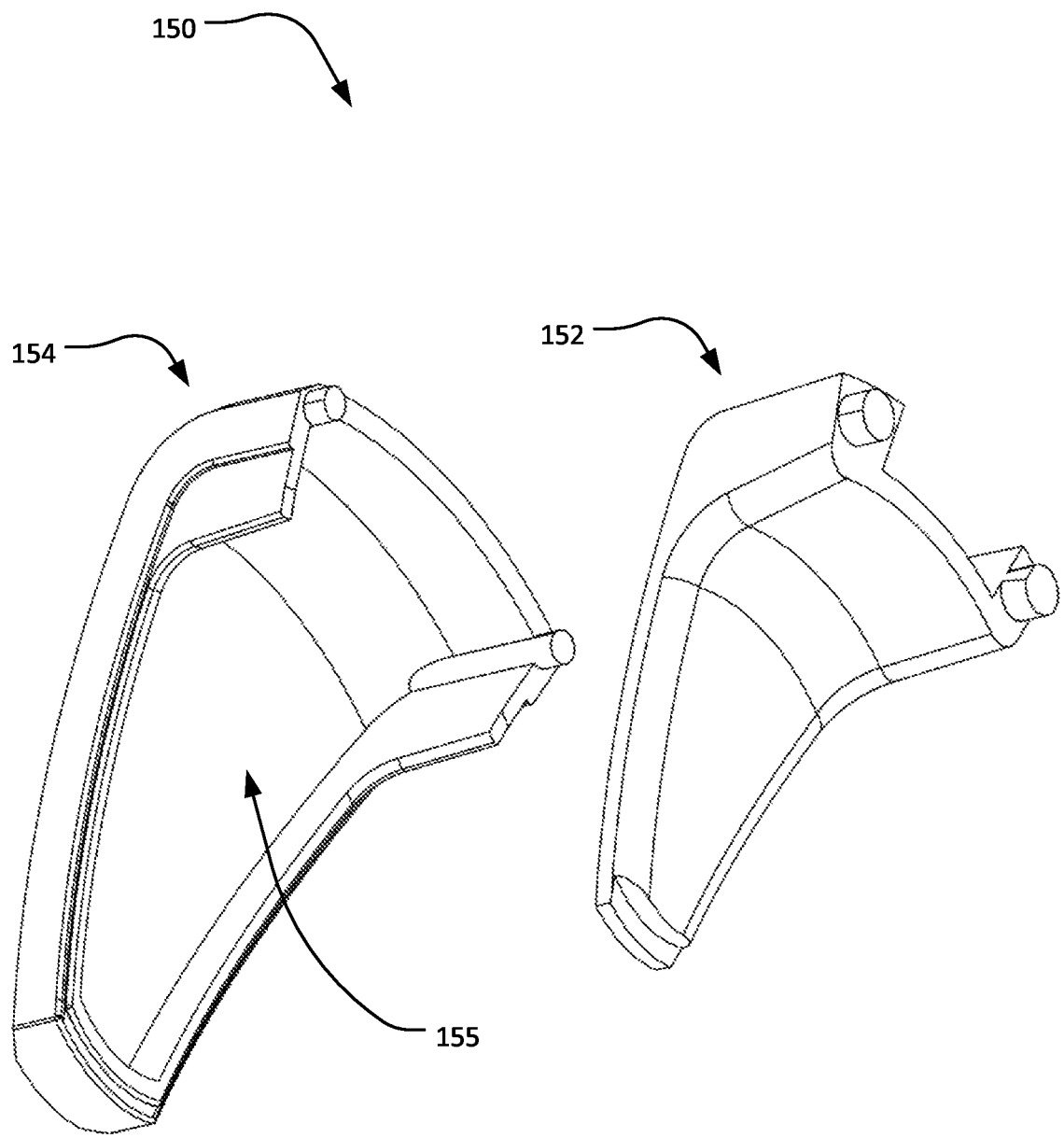
FIG. 16B is an opposite exploded perspective view of the secondary clip of the two-way radio unit of FIG. 1

The hub 110 has an exterior side 111a and an interior side 111b and defines a hub cavity 112 therebetween. In the embodiment 100, the hub 110 has an exterior housing 113 at the exterior side 111a and an interior housing 115 at the interior side 111b. The interior side 111b has at least one speaker opening 116, and (as shown in FIGS. 5 and 11A) the interior side 111b may have an annular surface 117 and a recessed central area 118 therein which includes at least some of the speaker openings 116. The exterior and interior housings 113, 115 may be constructed of any appropriate materials (e.g., plastic, composite, metal, and/or rubber, et cetera), may include subportions, and may be coupled together by any appropriate fastening devices and techniques (e.g., clips, screws, and/or adhesive, et cetera).

It may be particularly desirable for a neck lock 122 (FIGS. 3A, 4, 13A, and 13B) to be fastened to the exterior housing 113 and/or the interior housing 115 (e.g., through clips, screws, and/or adhesive, et cetera) for locking the primary clip 130 to the hub 110, as discussed in additional detail below.

A support bridge 126 (FIGS. 3A, 12A, and 12B) may be located in the hub cavity 112 for supporting the push to talk button 207 such that the push to talk button 207 is accessible at the hub exterior side 111a without interfering with any components inside the hub 110. For example, the push to talk button 207 may be accessible at a flexible area 113a of the exterior housing 113. Or, said differently, the flexible area 113a may define a user interface of the push to talk button 207.

Figure 3A:
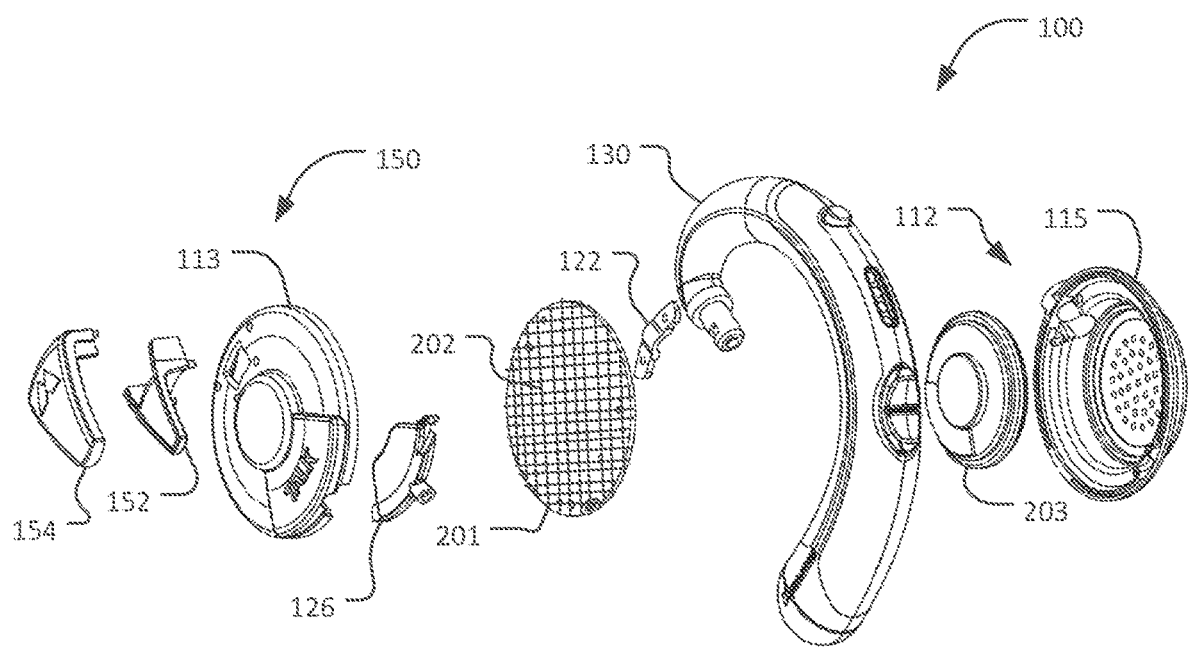
FIG. 3A is a partially exploded view of the two-way radio unit of FIG. 1, with some elements omitted for clarity.
Figure 3B:
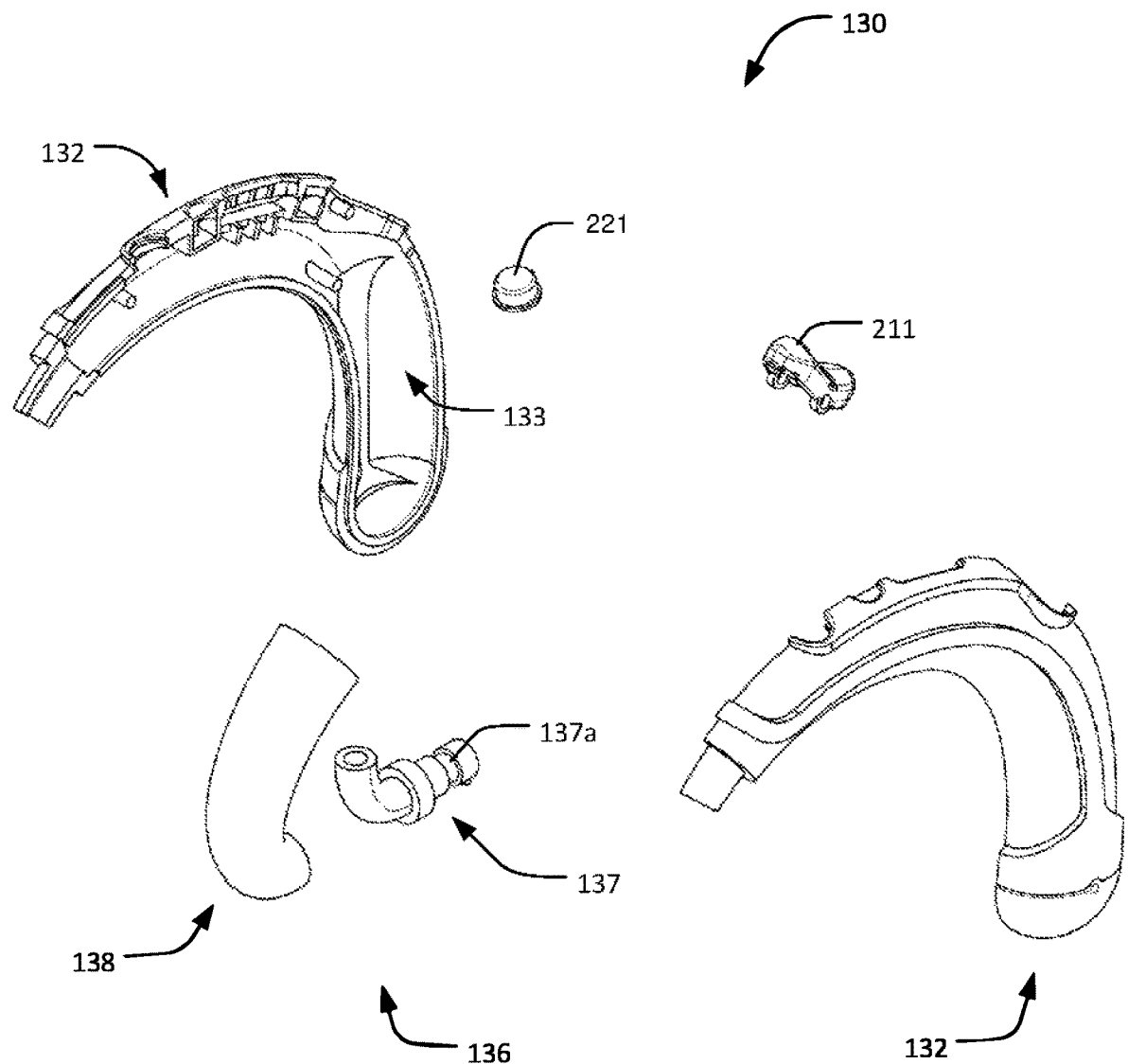
FIG. 3B is an exploded view of part of the two-way radio unit of FIG. 1, with some elements omitted for clarity.

As shown in FIG. 3A, the speaker 203 is located in the hub cavity 112 such that an output of the speaker 203 is directed to the speaker openings 116, and the first circuit board 201 is located in the hub cavity 112 between the speaker 203 and the hub exterior side 111a.

Figure 4:
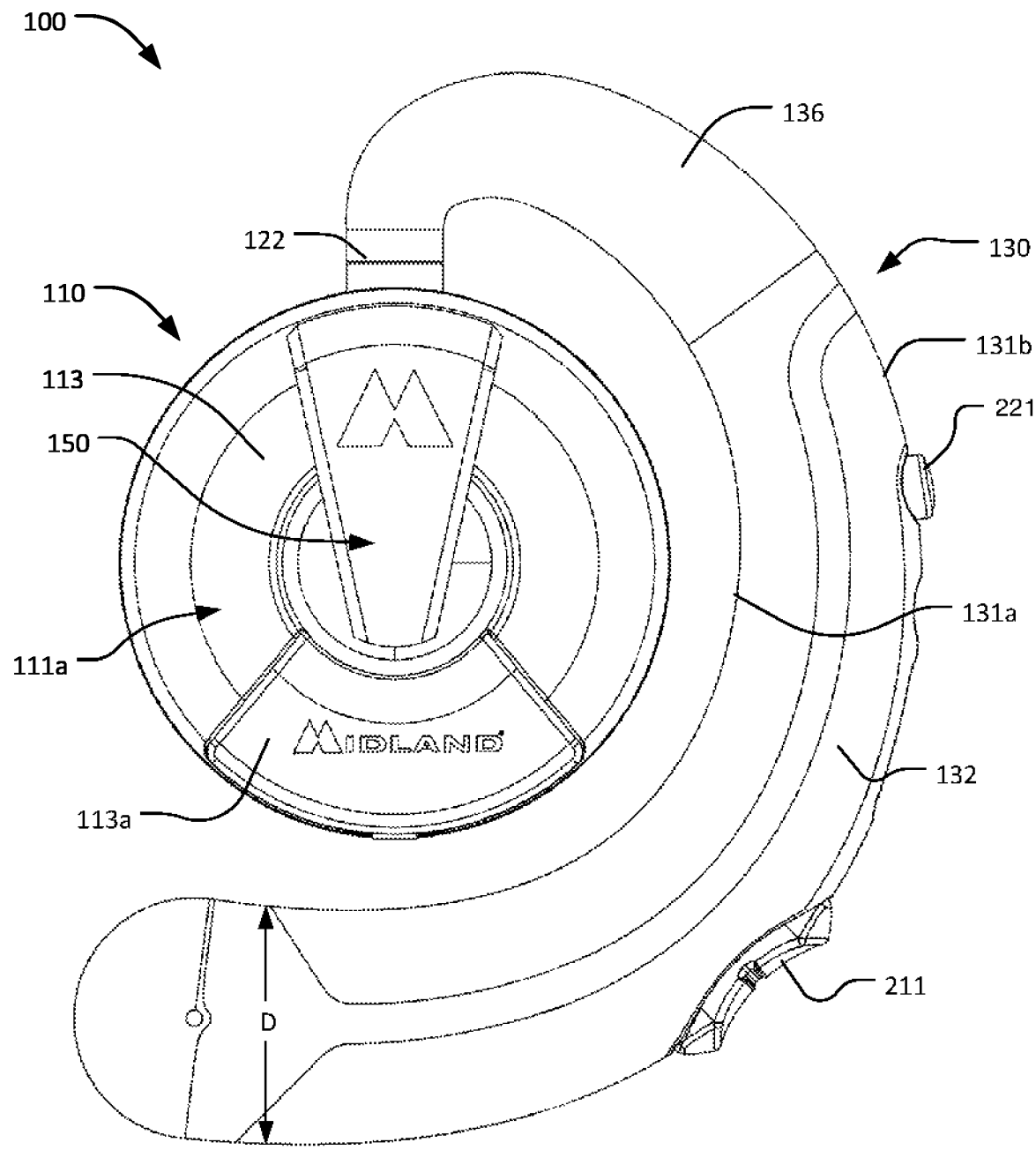
FIG. 4 is a front view of the two-way radio unit of FIG. 1.

The primary clip 130 extends from the hub 110 for selective attachment to a wearer's ear such that the speaker opening 116 is directed to an ear canal of the wearer. In the embodiment 100, the primary clip 130 has a distal segment 132 and a proximal segment 136. As shown in FIG. 4, it may be particularly desirable for a diameter D of the primary clip 130 to progressively enlarge along the proximal and distal segments 136, 132, with the diameter D having a maximum value at the distal segment 132. Both a near side 131a and a far side 131b of the primary clip 130 may be generally arcuate along at least a portion of the proximal and distal segments 136, 132, as shown in FIG. 4, with the arc of the far side 131b having a larger radius than the arc of the near side 131a and with a center point of each arc being offset relative to one another.

The distal segment 132 defines a cavity 133 and may be initially formed in at least two pieces that can be permanently or removably attached together (e.g., through clips, screws, and/or adhesive, et cetera). Various components may be housed in the cavity 133—for example, the second circuit board 209 and the battery 213. And other components (e.g., the user inputs 211) may extend from the distal segment 132 and optionally extend into the cavity 133. By including both the first and second circuit boards 201, 209, the size of the hub 110 may be reduced relative to embodiments having only a single (larger) circuit board. In addition, placing the second circuit board 209 and the battery 213 in the distal segment 132 may provide an improved weight balance for the user. Other (nonexclusive) example components that may be included in the distal segment 132 include orientation magnets 221 for orienting the unit 100 relative to a charging device and charging components (e.g., contacts) 223 for transferring energy from the charging device to the battery 213. While it may be particularly desirable for the distal segment 132 to be generally rigid, rubberized or other appropriate coatings may be applied through over molding, dipping, or other manufacturing processes (whether now known or later developed).

The proximal segment 136 connects the distal segment 132 to the hub 110 and is preferably resiliently flexible such that a distance between the hub 110 and the primary clip distal segment 132 is variable. To allow such resilient flexibility, rubber and/or other appropriate materials may be used (either with or without flexible metal or other internal support) for the proximal segment 136.

The proximal segment 136 may further be rotatably coupled to the hub 110 such that the primary clip 130 is orbital about the hub 110, i.e., is either partially or completely rotatable (for example, in path P1) around the hub 110. Like the distal segment 132, the proximal segment 136 may include multiple pieces. In the embodiment 100, the proximal segment 136 includes a neck 137 that may be coupled to a body 138 through a press fit, adhesive, and/or any other appropriate fastening device or method. The neck 137 includes a recess 137a, and the neck lock 122 has a protrusion 122a that fits inside the recess 137a and locks the neck 137 (and thus the proximal segment 136) to the hub 110 when the neck lock 122 is fastened. By extending the recess 137a around part or all of the neck 137, the neck 137 may rotate relative to the neck lock 122.

Figure 6:
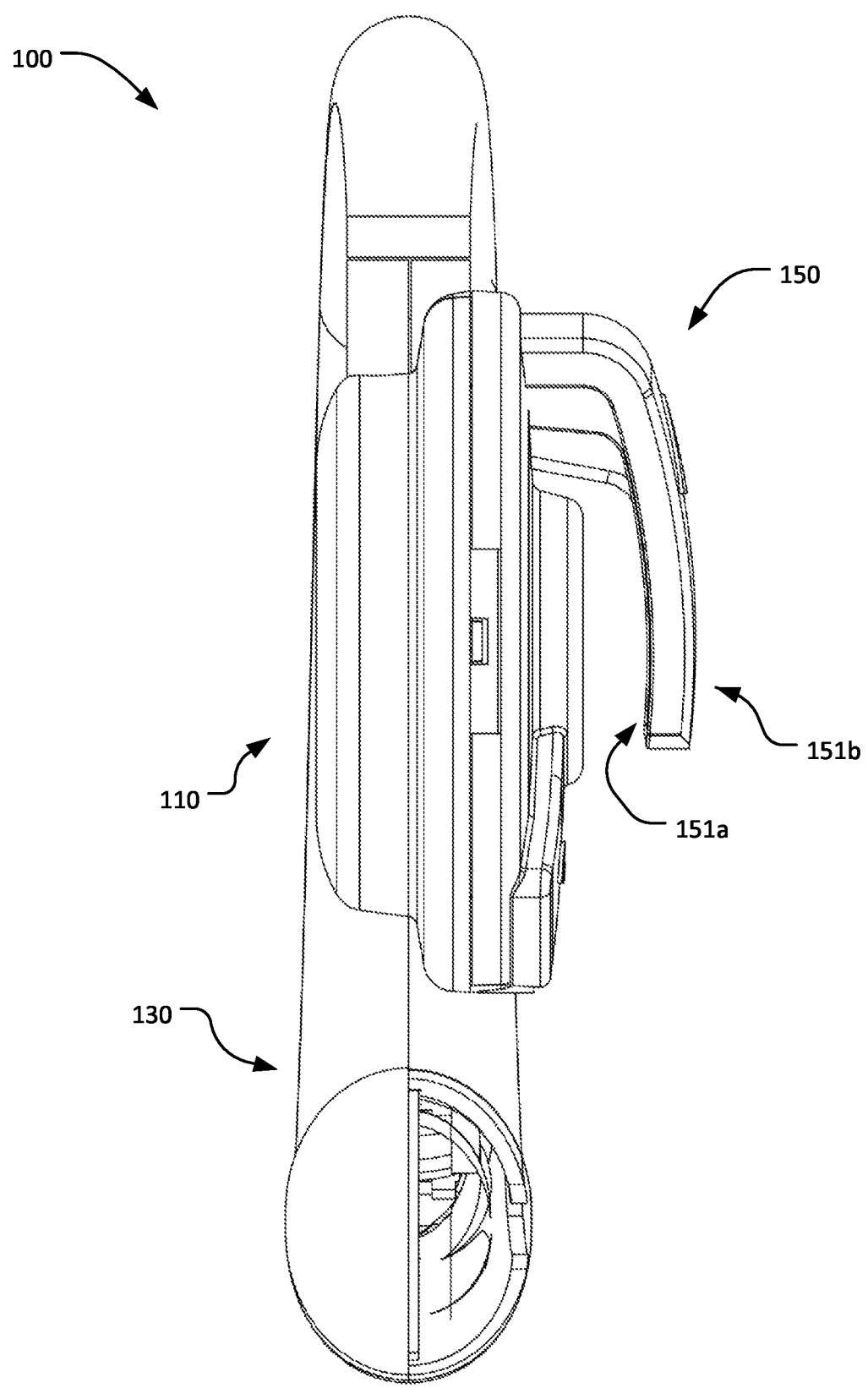
FIG. 6 is an end view of the two-way radio unit of FIG. 1.
Figure 7:
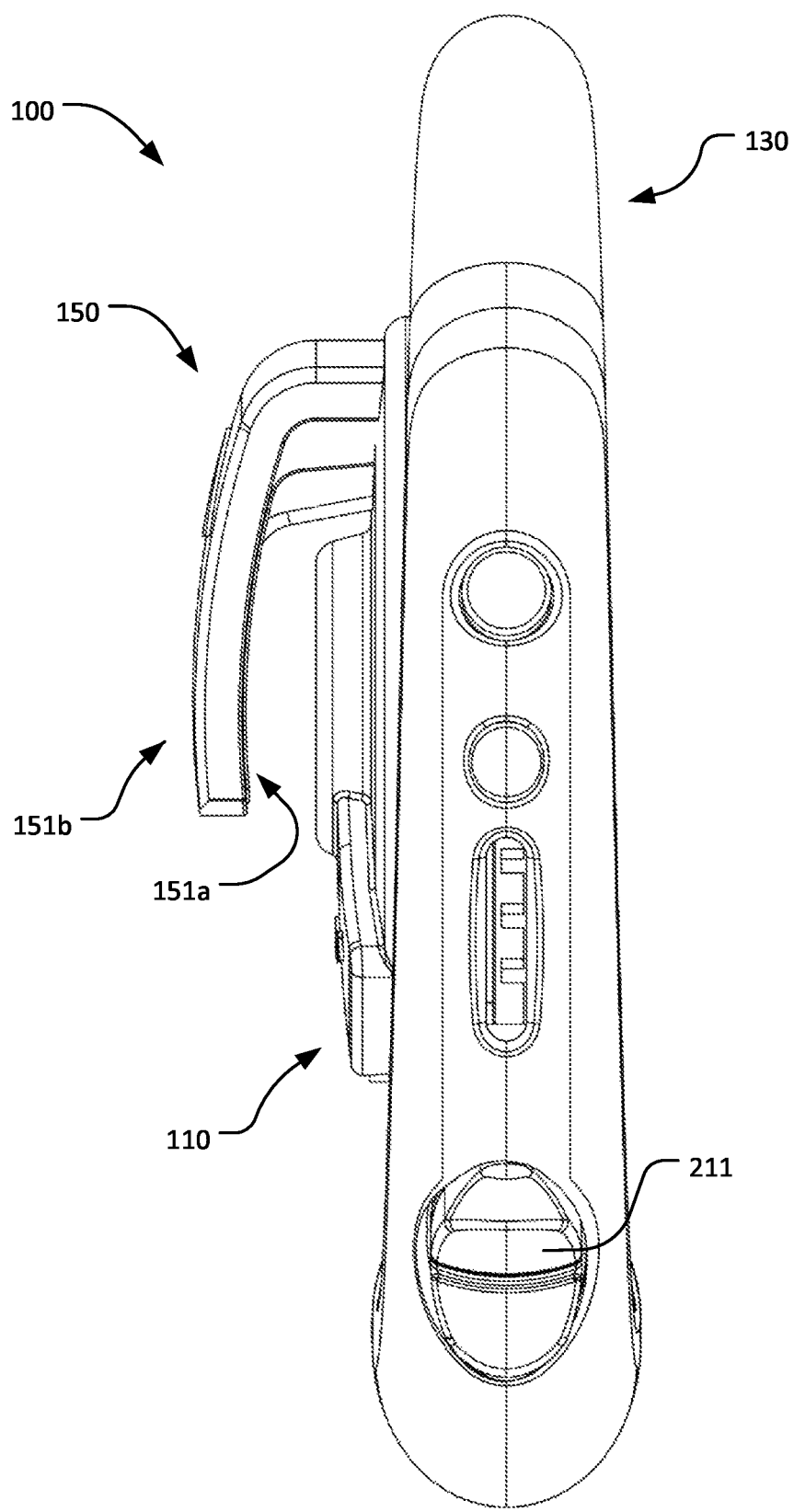
FIG. 7 is an opposite end view of the two-way radio unit of FIG. 1.
Figure 8:
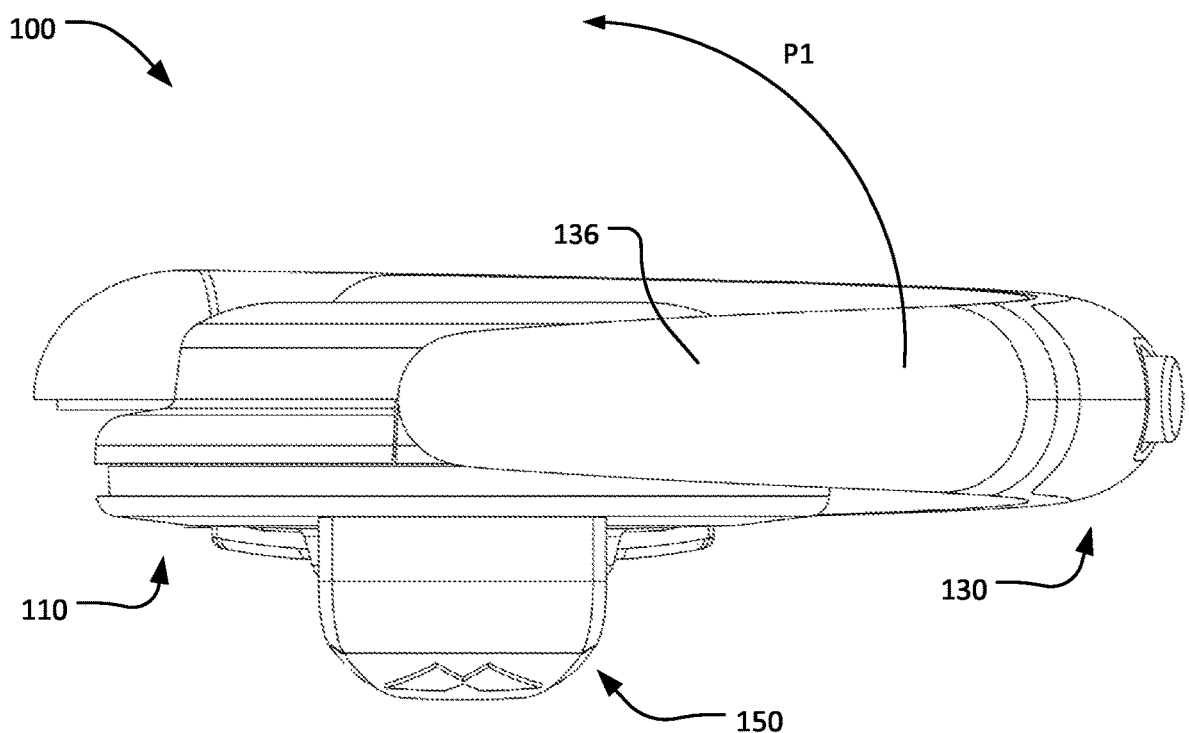
FIG. 8 is a top view of the two-way radio unit of FIG. 1.
Figure 9:
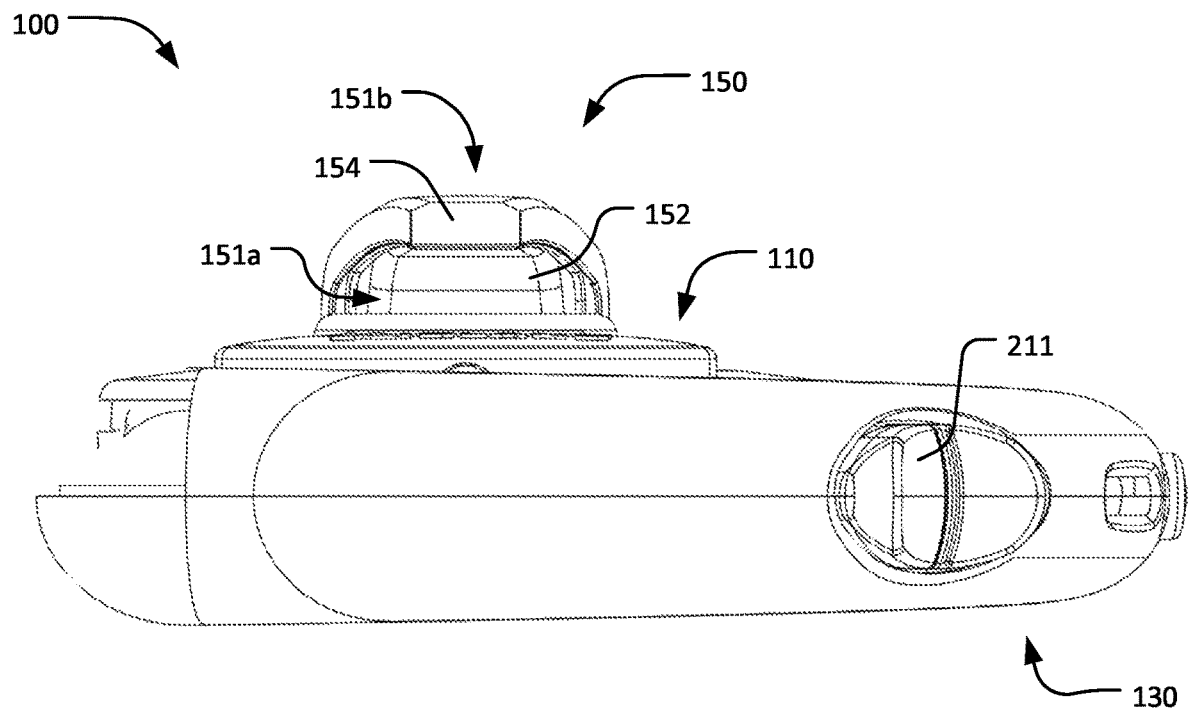
FIG. 9 is a bottom view of the two-way radio unit of FIG. 1.
Figure 10A:
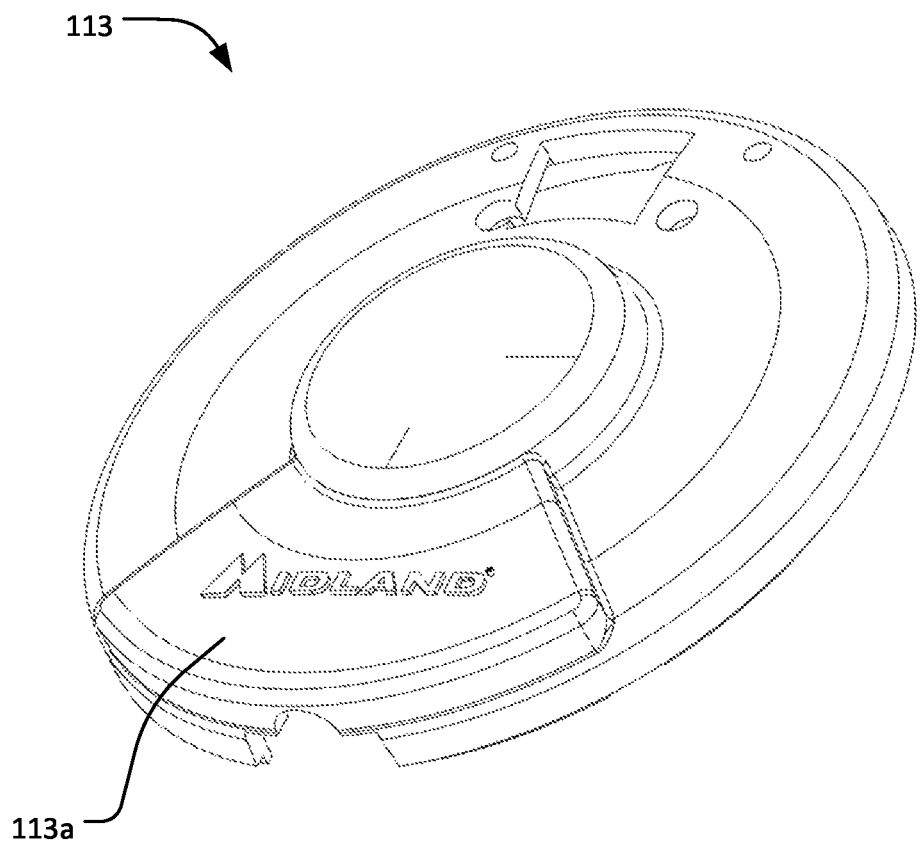
FIG. 10A is a perspective view of the exterior housing of the two-way radio unit of FIG. 1.
Figure 10B:
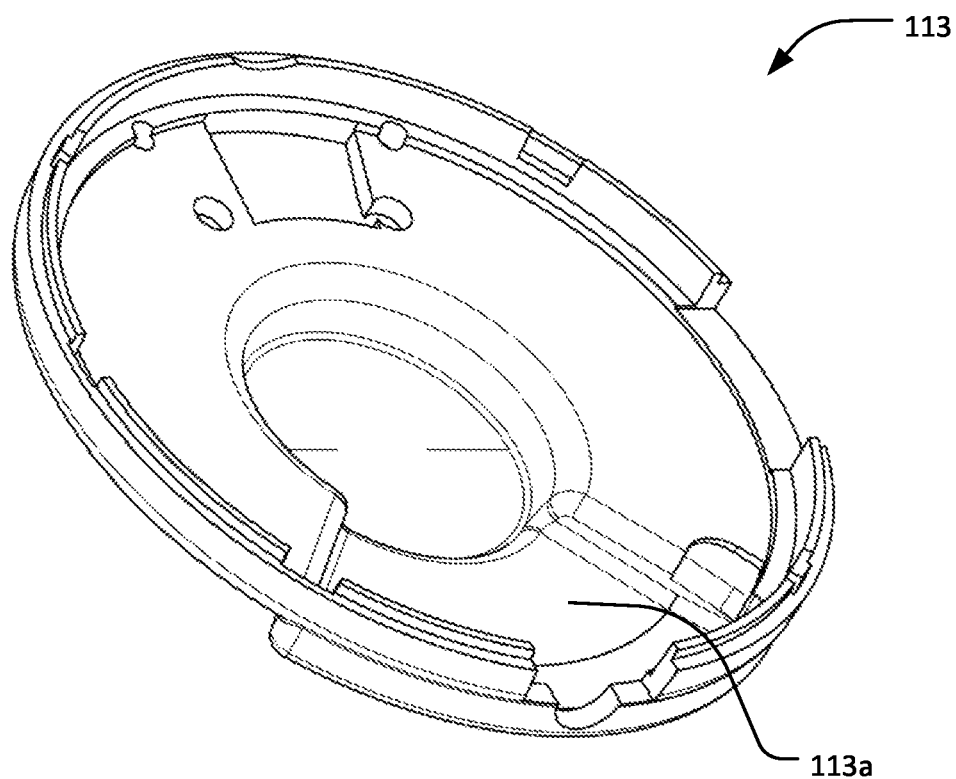
FIG. 10B is an opposite perspective view of the exterior housing of the two-way radio unit of FIG. 1.

The secondary clip 150 extends outwardly from the hub exterior side 111a such that the push to talk button 207 is unobscured by the secondary clip 150 and the hub exterior side 111a is between the secondary clip 150 and the hub interior side 111b. The secondary clip 150 may include an antenna support 152 and an antenna cap 154 (FIGS. 16A and 16B), with the antenna support 152 being on an interior side 151a of the secondary clip 150 and the antenna cap 154 being on an exterior side 151b of the secondary clip 150 (FIGS. 6 and 7). The antenna support 152 and the antenna cap 154 are coupled together (e.g., by clips, screws, and/or adhesive, et cetera) and define an antenna cavity 155 housing the antenna 215.

As described, the speaker 203, the first circuit board 201, the exterior housing 113, and the antenna support 152 are between the hub interior housing 115 and the antenna 215. In fact, the hub interior housing 115, the speaker 203, the first circuit board 201, the exterior housing 113, and the antenna support 152 are between the wearer and the antenna 215 when the unit 100 is worn at the ear as intended. And still further, the antenna support 152 spaces the antenna 215 out away from the wearer. All of this may be particularly important in reducing an amount of energy from the antenna 215 that reaches the wearer's head. Additionally, a shield (or "reflector") 202 may be positioned between the antenna 215 and the wearer inside the unit 100. While such a reflector 202 may be located in the antenna support 152 between the antenna 215 and the hub 110 or located at various places inside the hub 110 (or even on an outer surface of the antenna support 152 or the hub 110), it may be particularly beneficial to provide the reflector 202 as a solid or mesh copper layer formed with or attached to the first circuit board 201. Such embodiments may allow sufficient transmission from the antenna 215 without undue interference while blocking a significant amount of energy from reaching the wearer and also maintaining a desirable size of the hub 110 and facilitating assembly.

Figure 17:
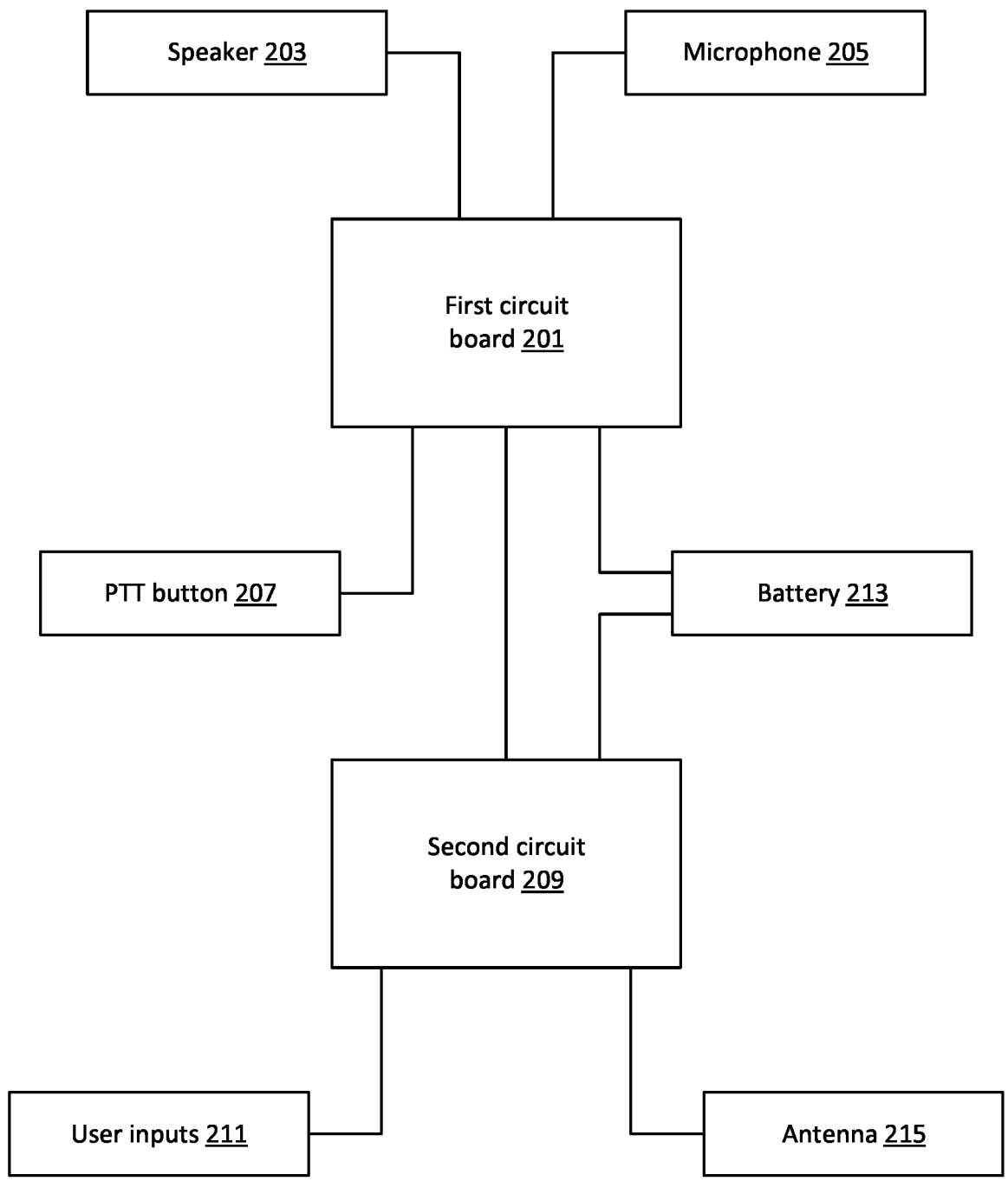
FIG. 17 is a block diagram of the two-way radio unit of FIG. 1.

FIG. 17 shows an example arrangement of the various electronic components. The speaker 203, the microphone 205, and the push to talk button 207 are shown in communication with the first circuit board 201, the user inputs 211 and the antenna 215 are shown in communication with the second circuit board 209, and the first and second circuit boards 201, 209 are shown in communication with one another. While this arrangement is currently preferred, other arrangements are of course possible and may nevertheless constitute improvements over the prior art.

Figure 18:
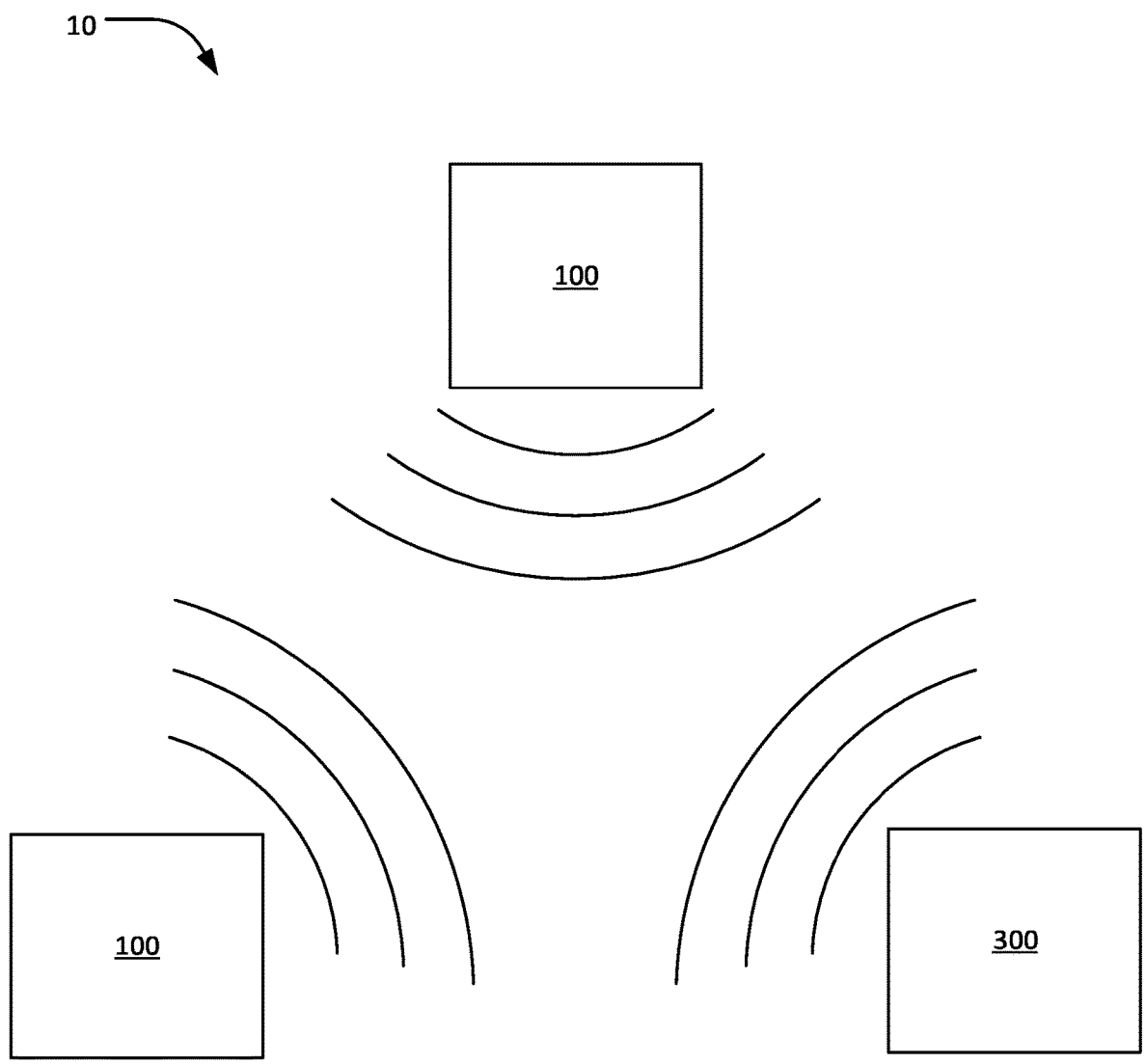
FIG. 18 is a block diagram of a short-range communication system having the two-way radio unit of FIG. 1, according to an embodiment of the current disclosure.

FIG. 18 shows a short-range communication system 10 having the two-way radio unit 100 of FIGS. 1-17. The system 10 includes multiple two-way radio units 100 for communication between one another. For example, the wearer of one of the units 100 may push the push to talk button 207. Upon actuation of the push to talk button 207, the unit's first circuit board 201 and/or the second circuit board 209 may cause the antenna 215 to output radio waves to transmit sounds obtained through the microphone 205. Those radio waves may then be received by the other units 100, and their first and/or second circuit boards 201, 209 may cause audible sound corresponding to the radio waves to be output through their respective speakers 203. The user inputs 211 of the various units 100 may be used to power the units 100 on/off, to adjust such things as speaker volume and radio channel, et cetera. While two units 100 are shown in FIG. 18, substantially more units 100 may be included. A handheld unit (or "walkie-talkie") 300 is also shown and may be used in the system 10 in addition to the ear-mounted units 100. Though significant benefits are associated with the ear-mounted units 100, handheld units 300 having a transmitter and a receiver or other radios having a transmitter and a receiver may nevertheless be used to transmit and receive radio waves on frequencies compatible with the units 100.

Very notably, the ear-mounted units 100 are capable of direct communication in the system 10 without a relay or repeater. For example, no belt-worn radio is necessary to relay signals to or from the units 100. Nevertheless, in some embodiments one or more stationary relay or repeater may be used to increase the transmission range of the units 100 and/or the units 300. And though generally less desirable, some embodiments may include one or more mobile relay or repeater (e.g., a belt-mounted unit) to relay signals to or from the units 100.

Figure 19:
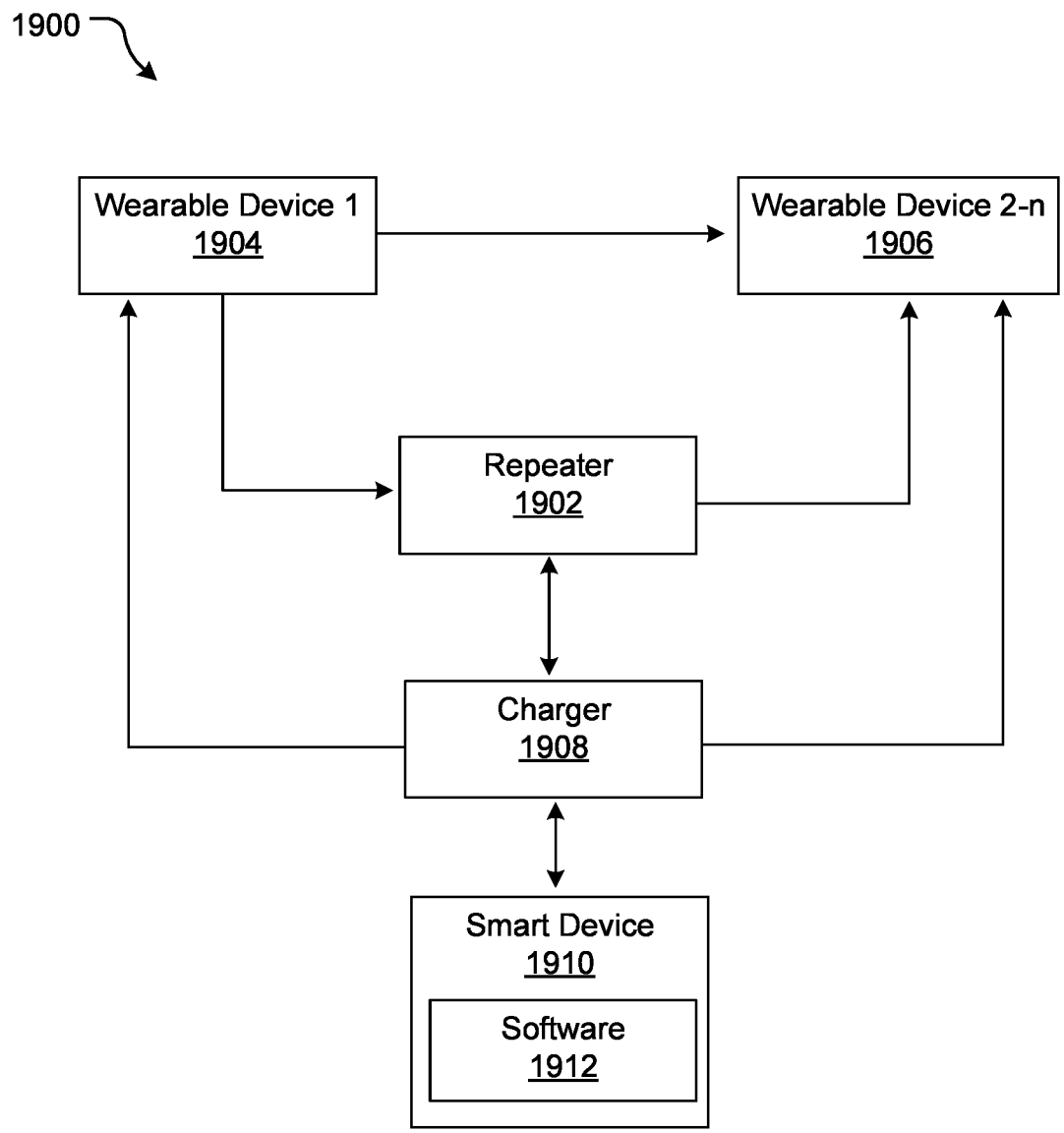
FIG. 19 is a block diagram of a communication system having the two-way radio unit of FIG. 1 in use with a repeater and a charger, according to an embodiment of the current disclosure.

In FIG. 19, an embodiment of a communication system 1900 is shown in accordance with the present disclosure. Communication system 1900 includes a repeater 1902, which functions to increase the transmission range and clarity associated with the communication system 1900, a first wearable device 1904, which in at least some embodiments is the two-way ear-mounted radio 100 discussed above and which has any or all of the features discussed above, and one or more wearable device 1906. The one or more wearable devices 1906 may also be the two-way ear-mounted radio 100 discussed above and may have some or all of the features therein. A respective device may go back and forth between being a device 1904 and a device 1906, with the device being designated a device 1904 when transmitting audio data and being designated a device 1906 when receiving audio data. Wearable devices 1904, 1906 and repeater 1902 function to transmit and receive RF signals and convert the signals to audio messages for the user(s). For example, the first wearable device 1904 may receive audio data from a first user, convert the audio data to an RF signal, and then either transmit the RF signal to the repeater 1902 or directly to the one or more wearable devices 1906. The use of repeater 1902 may increase the area through which an RF signal can be effectively transmitted, and in addition may allow the RF signal to be transmitted around obstacles.

The first wearable device 1904 and the wearable device(s) 1906 can each be switched between a talker state and a listener state. In the exemplary embodiment shown in system 1900, wearable device 1904 is in a talker state, whereas all of the one or more listening wearable devices 1906 are in a listener state. In any given time, only one wearable device can be in a talker state.

As discussed above, audio data can be wirelessly transmitted directly between the first wearable device 1904 in a talker state and the wearable device(s) 1906. However, in system 1900, the audio data can also be transmitted to the repeater 1902, which can then provide manipulation of the audio data to then be transmitted to the wearable device(s) 1906.

As would be understood by those skilled in the art, wearable communication systems are generally limited in their efficacy for several reasons. First, these wearable devices of communications systems must be small and light enough to be worn by a user. These size and weight requirements limit the characteristics (e.g., effective range, strength of signal, etc.) of the prior art wearable communications devices. Further, regulations limit the amount of Radio Frequency (RF) energy that a user may absorb, for example, in areas like a user's head. That is, any RF device in close proximity to a user's head must limit the SAR (Specific Absorption Rate) to minimize user harm. Prior art wearable systems typically use a multi-piece communications system (e.g., a headset that relays audio to a user and communicates with a belt worn RF relay) to accommodate these RF energy regulations. These multi-piece communications systems may still be cumbersome for a user, and the extra equipment presents an increase in cost and complexity over one-piece communications systems.

Another issue that presents itself for wearable communication systems is the nature of RF signals themselves. Wearable communication devices are generally used in environments where obstacles are present, such as walls, people, et cetera. These obstacles may interfere with incoming and outgoing RF signals. Further, users are typically moving around in these environments which may complicate the sending and receiving of the RF signals. Situations may also occur where users are outside of the effective range of the other wearable devices. These factors result in undesirable situations where audio messages are not fully relayed and/or received between users. Embodiments of the wearable communication systems disclosed herein may remedy at least some of the issues discussed above through use of the repeater 1902.

Figure 20:
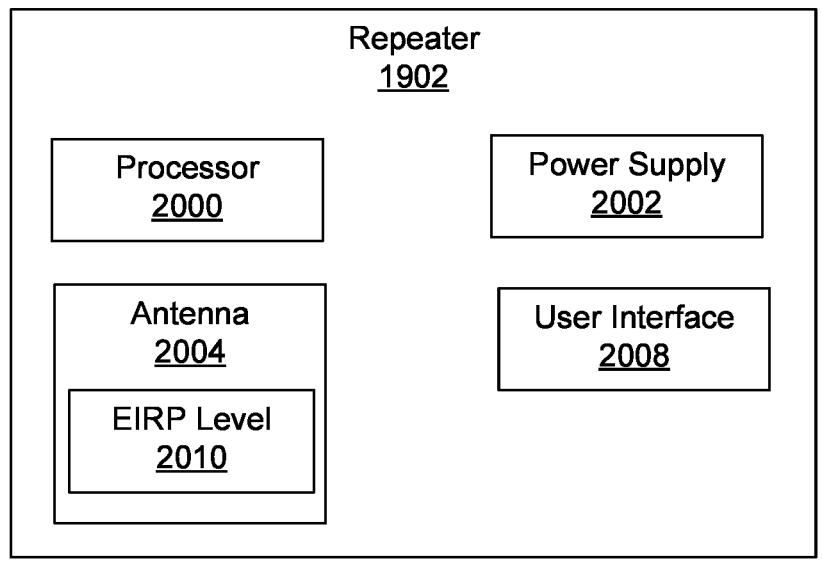
FIG. 20 is a block diagram of the repeater of FIG. 19, according to an embodiment of the current disclosure.

FIG. 20 shows a block diagram of the repeater 1902 in accordance with embodiments of the present application. The repeater 1902 may desirably manipulate or alter one or more qualities of the RF signal received from the first wearable device 1904, such as amplification, spatial diversity, polarization diversity, and/or time diversity. The repeater 1902 may be mounted, for example, on a wall or other object within the environment. The repeater 1902 may include a processor 2000, a power supply 2002, an antenna 2004 configured to receive RF signals from the wearable device 1904, and a user interface 2008. The processor 2000 provides any desired manipulation of the RF signals received by the antenna 2004 and then transmit RF signals (with any desirable manipulation) to the wearable device(s) 1906. The user interface 2008 may include one or more switch, button, light, or other features known in the art or later developed to receive information from and/or provide information to a user.

As discussed, the repeater 1902 may obtain RF signals from the first wearable device 1904 and route those RF signals (with any desired manipulation) to the one or more listening wearable devices 1906. Because the repeater 1902 is not worn by a user, the repeater 1902 may have greater RF capabilities than the wearable devices 1904, 1906. For example, in some embodiments, the repeater 1902 may have an Effective Isotropic Radiated Power (EIRP) level 2010 four times that of the EIRP level of the wearable devices 1904, 1906. In this way, the repeater 1902 may serve to increase the effective range of the wearable devices 1904, 1906. The repeater 1902 may additionally serve as an RF relay point that may circumvent obstacles that would otherwise preclude communication between the wearable devices 1904, 1906. For example, the repeater 1902 may be located on a wall, and the repeater 1902 may relay RF signals between wearable devices 1904, 1906 on opposing sides of the wall. Without the repeater 1902, communications between these wearable devices 1904, 1906 may be undesirably absorbed by the wall.

Figure 21:
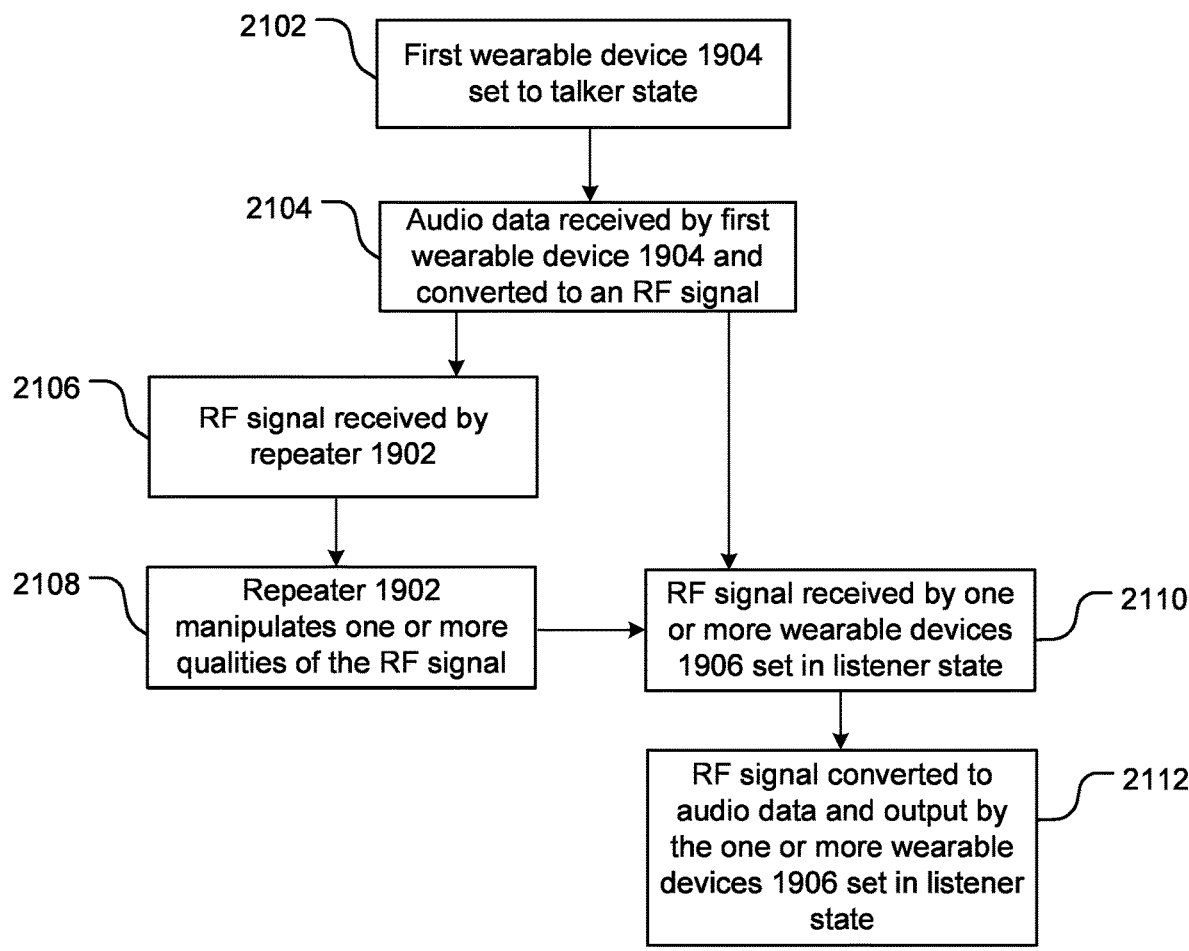
FIG. 21 is a flowchart of a method of communication using the two-way radio unit of FIG. 1 and the repeater of FIG. 20.

FIG. 21 further illustrates use of the repeater 1902. At step 2102, the first wearable device 1904 is set to the talker state. The first wearable device 1904 then receives audio data from a user and converts the audio data to an RF signal at step 2104. The RF signal is then transmitted from the first wearable device 1904 and may be received by both the repeater 1902 at step 2106 and one or more wearable devices 1906 set in the listener state at step 2110. The repeater 1902 may manipulate one or more qualities of the RF signal at step 2108 and then transmit the manipulated RF signal to the one or more wearable devices 1906 set in the listener state, and the wearable device(s) 1906 may receive such signals at the step 2110. The one or more wearable devices 1906 convert the received RF signals back to audio data and output the audio to users at step 2112.

The repeater 1902 may passively or actively provide time diversity to the RF signal (e.g., at the step 2108). That is, wearable device(s) 1906 may receive an RF signal from the repeater 1902 at a time offset from the time the RF signal would have been directly communicated to the wearable device(s) 1906 from the wearable device 1904. This time diversity of RF signals may serve to increase the chance (e.g., double the chance) that the wearable device(s) 1906 receive the RF signal originally communicated by the wearable device 1904 despite obstacles that would have precluded direct communication therebetween. The repeater time diversity may be passive (e.g., provided for by the inherent latency of the repeater) or active (e.g., designated by a user with a controller or a program). In some implementations, the repeater time diversity may be uniquely configured for each of the variable devices 1904, 1906. While a single repeater 1902 may be sufficient to relay RF signals between several wearable devices 1904, 1906 of the same or different groups, the use of additional repeaters 1902 in the wearable communications system is also contemplated herein.

The repeater 1902 can provide additional functions as well. For example, the repeater 1902 may broadcast a command to the wearable device(s) 1906 to prevent the wearable device(s) 1906 from entering a talker state when the first wearable device 1904 is in the talker state.

Referring back to FIG. 19, the repeater 1902 may also be communicatively linked (wired or wireless) to a charger 1908 providing various functions. The charger 1908 may also be communicatively linked to the wearable devices 1904, 1906, such that control data can be transmitted from the charger 1908 to the wearable devices 1904, 1906. The charger 1908 may be configured to monitor the wearable devices 1904, 1906 and/or send commands thereto. In some embodiments, the commands may be sent first through the repeater 1902 and then to the wearable devices 1904, 1906. The charger 1908 may also be configured to dock and charge the power supplies of the wearable devices 1904, 1906. The repeater 1902 and/or the wearable devices 1904, 1906 may receive software and/or firmware updates via the charger 1908.

In some embodiments, a smart device 1910 with software 1912 thereon, such as a mobile application, is further provided and communicatively linked to at least the charger 1908. Software 1912 may be used to control and/or monitor the repeater 1902 and/or the wearable devices 1904, 1906, such as by monitoring their power supply status, sending pings to the devices, monitoring packet loss, et cetera. The smart device 1910 may be used to program functions and settings on the wearable devices 1904, 1906. For example, one or more programmable functions may include a group scan function configured to be activated by a button and upon activation, the first wearable device 1904 will scan one or more groups of wearable devices to find an active conversation; and a group lock function configured to lock the first wearable device 1904 into one of the one or more groups of wearable devices.

As discussed above, each of the wearable devices 1904, 1906 may include a reflector to preclude the user from absorbing an undesirable amount of RF energy (i.e., to lower the SAR value of the wearable device). This reflector may be located between an RF antenna of the wearable device and the user's body (e.g., the user's head for a wearable device that is an earpiece). With this reflector arrangement, the wearable device's RF send/receive capability may be enhanced while simultaneously reducing the amount of RF energy absorbed by the user, which may enable a one-piece configuration of the wearable devices to be employed.

The artisan will understand that the wearable communications system disclosed herein may include or have associated therewith electronics (e.g., within the wearable devices, the repeater, the charging station, et cetera). The electronics may be used to control and modify the operation of the wearable communications system (e.g., control and/or monitor operations of the repeater and the wearable devices, control the charging station, et cetera). In some example embodiments, the processor or processors may be configured through particularly configured hardware, such as an application specific integrated circuit (ASIC), field-programmable gate array (FPGA), etc., and/or through execution of software to allow the wearable communications system to function in accordance with the disclosure herein.

While example applications (e.g., relaying audio between a plurality of workers in a building) are used to illustrate the workings of the wearable communications system, the artisan will understand that the wearable communications system disclosed herein may be adapted to other similar wearable communications application functions, and that such adaptions are within the scope of the present disclosure. Examples of other similar wearable communications application functions may include any application where remote communication between two or more users is needed, such as at a social event, an entertainment venue, a high security area, et cetera.

Thus, as has been described, the wearable communications system concepts disclosed herein may serve to provide remote communication between a plurality of users while minimizing the amount and/or size of the equipment to be worn. Moreover, the repeater concepts disclosed herein may significantly increase the RF capabilities of the wearable devices disclosed herein.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the present disclosure.

The invention claimed is:

1. A short-range communication system comprising:
    a plurality of wearable units each comprising:
        a hub having a speaker therein;
        a primary clip extending from the hub for selective attachment to a wearer's ear such that the speaker is directed to an ear canal of the wearer;
        a secondary clip extending outwardly from the hub such that an exterior side of the hub is between the secondary clip and the speaker;
        an antenna within the secondary clip;
        a reflector between the secondary clip and the speaker; and
        a microphone;
        wherein each said wearable unit of the plurality of wearable units is in either a transmit state or a listener state, with a maximum of one said wearable unit being in the transmit state at any point in time; and
    a stationary repeater having a processor and circuitry, the stationary repeater configured to: (a) manipulate original RF signals transmitted by at least one transmitting wearable unit of the plurality of wearable units; and (b)

transmit the manipulated original RF signals to at least one listening wearable unit of the plurality of wearable units.

2. The short-range communication system of claim 1, wherein the manipulated original RF signals include a time offset relative to the original RF signals.

3. The short-range communication system of claim 2, wherein the time offset is user-configurable.

4. The short-range communication system of claim 3, wherein the user-configurable time offset is independently configurable for each of the plurality of wearable units.

5. The short-range communication system of claim 1, wherein the manipulated original RF signals include at least one item selected from a group consisting of a time offset relative to the original RF signals and an amplification of the original RF signals.

6. The short-range communication system of claim 1, wherein the manipulated original RF signals include at least one item selected from a group consisting of a polarization diversity relative to the original RF signals and a spatial diversity relative to the original RF signals.

7. The short-range communication of claim 1, wherein at least one said wearable unit in a listener state of the plurality of wearable units is configured to convert to audio at one time either the original RF signals or the manipulated original RF signals.

8. The short-range communication system of claim 1, wherein a distance between the hub and the primary clip of at least one of the plurality of wearable units is configured to be variable.

9. The short-range communication system of claim 1, each of the plurality of wearable units further comprise a push to talk button.

10. The short-range communication system of claim 9, wherein each push to talk button is located in the hub of one of the plurality of wearable units.

11. The short-range communication system of claim 1, wherein the stationary repeater is configured to be mountable.

12. The short-range communication system of claim 1, wherein the reflector is coupled to a circuit board situated within the hub.

13. The short-range communication system of claim 1, further comprising a charger communicatively linked to the stationary repeater and the plurality of wearable units.

14. A short-range communication system comprising:
a plurality of wearable units each comprising:
    a hub having a speaker therein;
    a primary clip extending from the hub for selective attachment to a wearer's ear such that the speaker is directed to an ear canal of the wearer;
    a secondary clip extending outwardly from the hub such that an exterior side of the hub is between the secondary clip and the speaker;
    an antenna;
    a reflector between the antenna and the speaker; and
    a microphone;
    wherein each said wearable unit is in either a transmit state or a listener state, with a maximum of one said wearable unit being in the transmit state at any point in time; and
a stationary repeater having a processor and circuitry, the stationary repeater configured to: (a) manipulate original RF signals transmitted by at least one transmitting wearable unit of the plurality of wearable units; and (b) transmit the manipulated original RF signals to at least one listening wearable unit of the plurality of wearable units;
wherein the manipulated original RF signals include a time offset relative to the original RF signals.

15. The short-range communication system of claim 14, wherein the time offset is user-configurable.

16. The short-range communication system of claim 14, wherein the time offset for each of the plurality of wearable units is independently configurable.

17. The short-range communication system of claim 14, wherein the manipulated original RF signals further include an amplification of the original RF signals.

18. A short-range communication system comprising:
a plurality of wearable units each comprising:
    a hub having a speaker therein;
    a primary clip extending from the hub for selective attachment to a wearer's ear such that the speaker is directed to an ear canal of the wearer;
    a secondary clip extending outwardly from the hub such that an exterior side of the hub is between the secondary clip and the speaker;
    an antenna within the secondary clip;
    a reflector between the secondary clip and the speaker; and
    a microphone;
    wherein each said wearable unit is in either a transmit state or a listener state, with a maximum of one said wearable unit being in the transmit state at any point in time; and
a stationary repeater having a processor and circuitry, the stationary repeater configured to manipulate original RF signals transmitted by at least one transmitting wearable unit of the plurality of wearable units;
wherein a distance between the hub and the primary clip of at least one of the plurality of wearable units is configured to be variable.

* * * * *